(12) United States Patent
Omura

(10) Patent No.: US 10,561,129 B2
(45) Date of Patent: Feb. 18, 2020

(54) FISHING LINE GUIDE, FISHING ROD INCLUDING FISHING LINE GUIDE, AND BLANK FOR FISHING LINE GUIDE

(71) Applicant: FUJI KOGYO CO., LTD., Shizuoka-shi (JP)

(72) Inventor: Kazuhito Omura, Shizuoka (JP)

(73) Assignee: FUJI KOGYO CO., LTD., Shizuoka-shi (JP)

(*) Notice: Subject to any disclaimer, the term of this patent is extended or adjusted under 35 U.S.C. 154(b) by 155 days.

(21) Appl. No.: 15/580,463

(22) PCT Filed: Jan. 5, 2017

(86) PCT No.: PCT/JP2017/000124
§ 371 (c)(1),
(2) Date: Dec. 7, 2017

(87) PCT Pub. No.: WO2017/168911
PCT Pub. Date: Oct. 5, 2017

(65) Prior Publication Data
US 2018/0168137 A1 Jun. 21, 2018

(30) Foreign Application Priority Data

Apr. 1, 2016 (KR) .......................... 10-2016-0040414
Aug. 9, 2016 (KR) .......................... 10-2016-0101399

(51) Int. Cl.
*A01K 87/04* (2006.01)
(52) U.S. Cl.
CPC .................................. *A01K 87/04* (2013.01)
(58) Field of Classification Search
CPC ....................................................... A01K 87/04
See application file for complete search history.

(56) References Cited

U.S. PATENT DOCUMENTS

| 4,507,891 A | * | 4/1985 | Ohmura | ................. | A01K 87/04 |
| | | | | | 43/24 |
| D280,656 S | * | 9/1985 | Ohmura | ....................... | D22/143 |

(Continued)

FOREIGN PATENT DOCUMENTS

| AU | 130863 S | 8/1997 |
| JP | 58-083265 U | 6/1983 |

(Continued)

OTHER PUBLICATIONS

International Search Report dated Feb. 21, 2017, in PCT/JP2017/000124 filed Jan. 5, 2017.

*Primary Examiner* — Richard G Davis
(74) *Attorney, Agent, or Firm* — Oblon, McClelland, Maier & Neustadt, L.L.P.

(57) ABSTRACT

A fishing line guide which is attached to a fishing rod and guides a fishing line. The fishing line guide includes a guide ring through which a fishing line passes, a support leg connected to the guide ring at an upper end, and an attachment foot extending from a lower end of the support leg and configured to be attached to a fishing rod. The attachment foot has a base end adjoining the lower end of the support leg and a leading end located opposite the base end. The attachment foot includes a slit portion and a pair of convex portions. The slit portion is perforated in the attachment foot along a central axis of the attachment foot from the base end toward the leading end. A pair of the convex portions are located at the slit portion and protrude toward the central axis respectively.

12 Claims, 32 Drawing Sheets

(56) References Cited

U.S. PATENT DOCUMENTS

| | | | |
|---|---|---|---|
| D484,216 S | * 12/2003 | Park | D22/143 |
| D507,623 S | * 7/2005 | Lin | D22/143 |
| 9,510,574 B2 | 12/2016 | Omura | |
| 2006/0283073 A1 | 12/2006 | Omura | |
| 2017/0118967 A1 | 5/2017 | Omura | |

FOREIGN PATENT DOCUMENTS

| | | |
|---|---|---|
| JP | 6-343373 A | 12/1994 |
| JP | 11-103728 A | 4/1999 |
| JP | 11-225628 A | 8/1999 |
| JP | 2007-215497 A | 8/2007 |
| JP | 1398325 S | 10/2010 |
| JP | 1495270 S | 4/2014 |
| JP | 5460544 B2 | 4/2014 |
| KR | 20-1998-020542 U | 7/1998 |
| KR | 10-1524407 B1 | 5/2015 |
| WO | 2015/037469 A1 | 3/2015 |

* cited by examiner

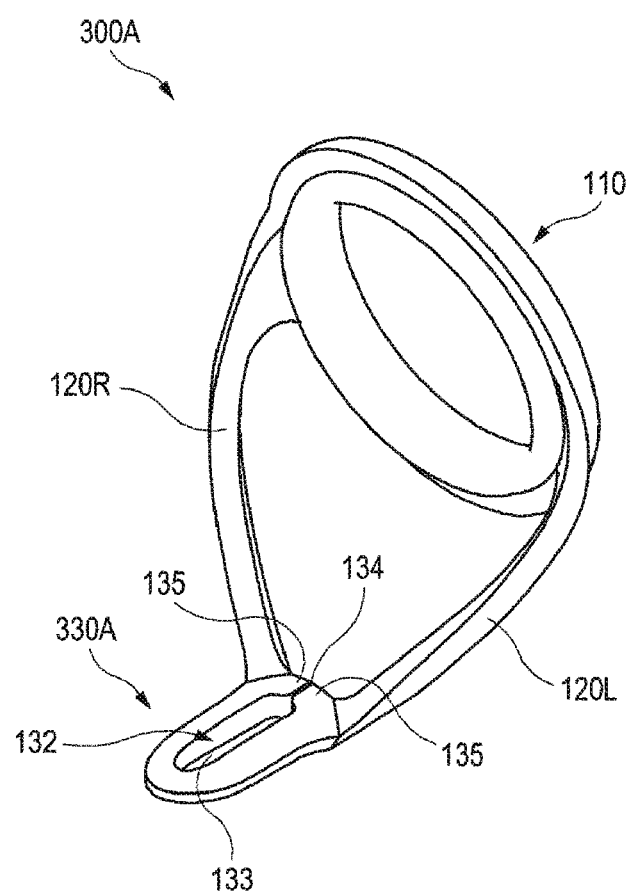

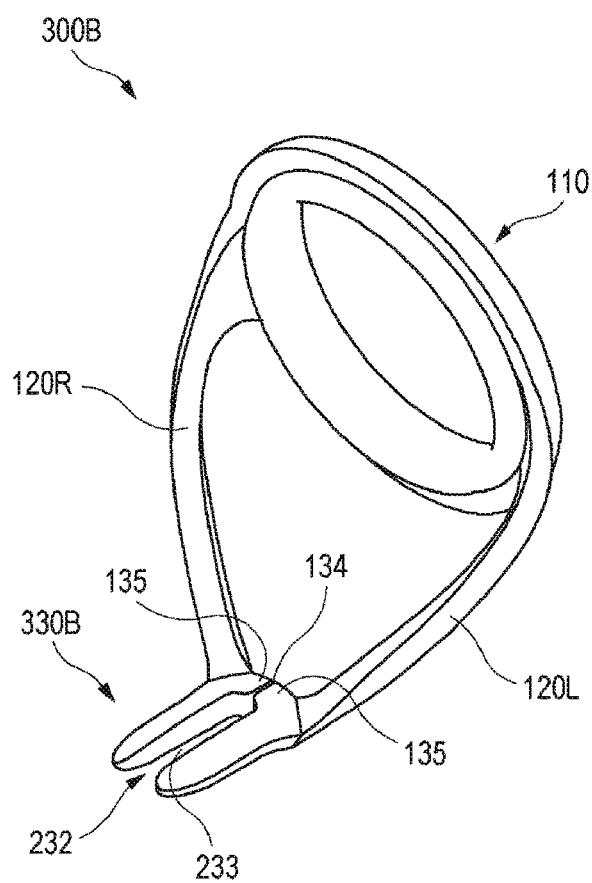

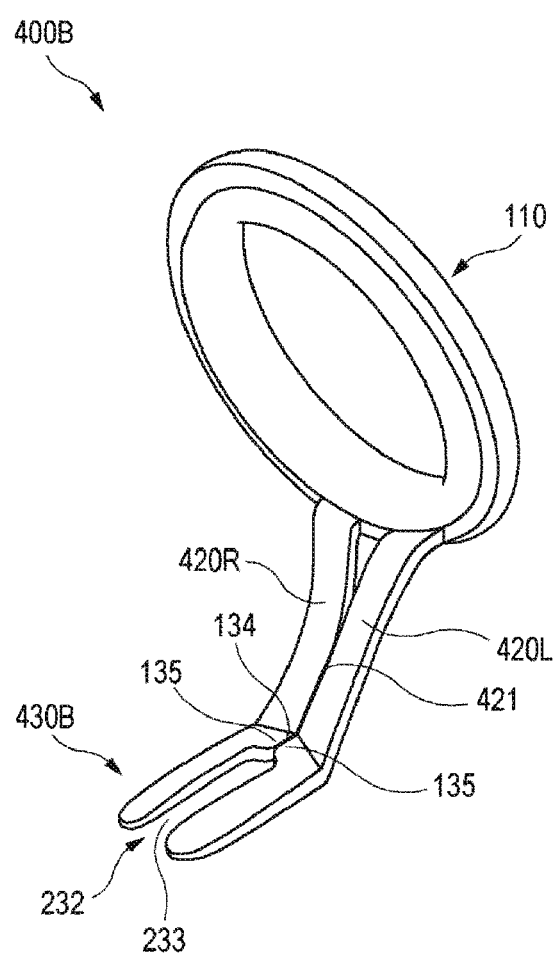

FISHING LINE GUIDE, FISHING ROD INCLUDING FISHING LINE GUIDE, AND BLANK FOR FISHING LINE GUIDE

CROSS-REFERENCE TO RELATED APPLICATIONS

This application is a 35 U.S.C § 371 national stage filing of International Application No. PC T/JP2017/000124, filed on Jan. 5, 2017, which claims the benefit of Korean Patent Application No. 10-2016-0040414, filed on Apr. 1, 2016 and Korean Patent Application No. 10-2016-0101399, filed on Aug. 9, 2016, the entire contents of each of which are incorporated by reference herein.

TECHNICAL FIELD

The present disclosure relates to a fishing line guide which is attached to a fishing rod and guides a fishing line, and a fishing rod including a fishing line guide. Further, the present disclosure relates to a blank for manufacturing a fishing line guide.

BACKGROUND

When a fishing rig is cast, a fishing line connecting with the fishing rig is unwound from a reel. When a fish is landed, the fishing line is wound around the reel. To guide the fishing line during casting a fishing rig or landing a fish, a fishing line guide is attached to a fishing rod.

As one example of casting a fishing rig, there is known a so-called three quarter casting in which a fishing rig is cast at a middle angle next to and above, and next to and beside a user's shoulder. During the three quarter casting, loads transversely act on a fishing line guide through a fishing line. Thus, torsion occurs in an attachment foot for attaching the fishing line guide to a fishing rod. Further, when landing a fish moving fast left and right, the user does not rapidly react to the fast movement of the fish, and therefore loads transversely act on the fishing line guide through the fishing line. Thus, torsion occurs in the attachment foot of the fishing line guide.

Thus, heavy loads are applied to the fishing line guide through the fishing line during casting a fishing rig or landing a fish. Therefore, the attachment position of the fishing line guide on the fishing rod can move (i.e., the fishing line guide is unintendedly moved away from the position where the fishing line guide is attached to the fishing rod).

As one example of a fishing line guide, Japanese Design Registration Publication No. 1495270 (Patent Document 1) discloses a fishing line guide having two attachment feet. According to Patent Document 1, a pair of lateral support legs extend from lateral sides of a guide ring. The lateral support legs get closer to each other at their lower ends, and a first attachment foot is formed at the lower ends of the lateral support legs. Further, a single, central support leg extends from an underside of the guide ring, and a second attachment foot is formed at a lower end of the central support leg.

In the fishing line guide disclosed by Patent Document 1, the first attachment foot mainly withstands the torsion, while the second attachment foot contributes to assisting the strength of the first attachment foot. The loads acting on the fishing line guide through the fishing line are applied to the lateral sides of the guide ring, and are transmitted to the first attachment foot through the lateral support legs as the torsion. In view of a diameter of a fishing rod to which the first attachment foot is attached, Patent Document 1 discloses that the first attachment foot is divided from the lower ends of the lateral support legs up to a leading end of the first attachment foot, but the entirety of the divided portions are closed. Further, work-hardening is performed in the entirety of the first attachment foot disclosed by Patent Document 1.

As another example of the fishing line guide having two attachment feet, Japanese Design Registration Publication No. 1398325 (Patent Document 2) discloses a fishing line guide wherein a first attachment foot is fully divided and each divided portion has a broader width.

Further, a reel seat for fixing a reel is also attached to a fishing rod by an attachment foot. Due to loads transversely acting on a reel, torsion occurs in the attachment foot of the reel seat. To cope with the torsion of the attachment foot of the reel seat and shaking of the reel seat caused by the torsion, the use of a wide base attached to the attachment foot of the reel seat is known in the technical field. The wide base has a width broader than the attachment foot of the reel seat, and is made separately from the attachment foot of the reel seat. However, such a wide base increases the weight of the reel seat, and the process for forming the wide base and the attachment foot integrally together is required. Therefore, the wide base is not employed to a fishing line guide.

Patent Document 1: Japanese Design Registration Publication No. 1495270

Patent Document 2: Japanese Design Registration Publication No. 1398325

To manufacture the fishing line guides disclosed by Patent Document 1 and Patent Document 2, a flat-plate-shaped blank, which is manufactured from a metallic sheet by press working (punching, blanking), may be used. Such a blank has a shape which is formed by spreading the fishing line guide to a development figure. FIG. 1 shows a blank which can be manufactured into the fishing line guide disclosed by Patent Document 1.

In the blank 900 shown in FIG. 1, a pair of first support legs 920L and 920R extend from lateral sides of a ring portion 910, and a U-shaped first attachment foot portion 930, which is formed into the aforementioned first attachment foot, is formed at free ends of the first support legs 920L and 920R. Further, a single, second support leg portion 940 extends from the ring portion 910, and a second attachment foot portion 950, which is formed into the aforementioned second attachment foot, is formed at a free end of the second support leg portion 940. The second attachment foot portion 950 coincides in shape with a slit portion 932 which is formed in the U-shaped first attachment foot portion 930. The aforementioned first attachment foot is formed by press working (bending, drawing) the first attachment foot portion 930 having the slit portion 932.

FIGS. 2A and 2B show an example where the aforementioned first attachment foot disclosed by Patent Document 1 is formed from the blank 900 shown in FIG. 1. As shown in FIG. 2A, the second attachment foot portion 950 is separated from the slit portion 932 of the U-shaped first attachment foot portion 930 by press working. Next, a first attachment foot 930' shown in FIG. 2B is formed by press working the entire first attachment foot portion 930. In the first attachment foot 930', the slit portion is closed, and the entire region FA of the first attachment foot 930' is work-hardened. To form the first attachment foot 930' shown in FIG. 2B, the press working, which causes the entire first attachment foot portion 930' to be work-hardened so as to close the slit portion 932, must be performed. However, due to a spring back phenomenon of a metallic material, the aforementioned first attachment foot fails to be formed in an intended shape shown in FIG. 2B, and has various defects.

FIGS. 3A and 3B show examples of the defects which occur in the attachment foot formed from the blank 900 by closing the entirety of the slit portion 932. As shown in FIG. 3A, irregular curved lines are created at edges of the first attachment foot 930' due to the spring back phenomenon, and an unintended irregular gap G may thereby be formed. Where the first attachment foot has the defect shown in FIG. 3A, the first attachment foot 930' has irregular widths, thus harming a fine appearance of the fishing line guide. Further, a winding thread, which is wound around a fishing rod and the first attachment foot 930' to firmly fix the fishing line guide to the fishing rod, cannot be densely and stably wound, thereby damaging the decorativeness of the fishing rod. As shown in FIG. 3B, where a pressure in the pressing working is not sufficient, the slit portion 932 of the first attachment foot portion cannot be closed due to the spring back phenomenon as it is intended, and a longitudinally long gap G is created in the first attachment foot 930'. Further, due to the insufficiency of the pressure of the press working, the entire first attachment foot 930' is not work-hardened to the required extent. Thus, the first attachment foot 930' can be twisted due to the torsion acting thereon.

Patent Document 2 discloses a first attachment foot which is fully divided and has a broader width. However, the first attachment foot having a broader width cannot easily fit with an outer surface of a fishing rod, thus considerably creating clearances between the first attachment foot and the fishing rod. Such clearances damages the decorativeness of the fishing rod. Further, a lot of fishing line guides, which include the first attachment feet having widths suitable for respective diameters of fishing rods, are required for application to such fishing rods having various diameters, but this increases manufacturing cost.

SUMMARY

Embodiments of the present disclosure are devised to solve the aforementioned problems of the prior art from the understanding of the problems of the prior art. Some embodiments of the present disclosure provide a fishing line guide, the attachment position of which does not move with respect to a fishing rod despite the torsion which occurs in an attachment foot due to loads applied by a fishing line. Further, some embodiments of the present disclosure provide a fishing line guide which has a torsion-resistance strength improved against the aforementioned torsion. Further, some embodiments of the present disclosure provide a fishing line guide which has an improved torsion-resistance strength and is light in weight. Further, some embodiments of the present disclosure provide a blank for manufacturing the aforementioned fishing line guide, and a fishing rod including the aforementioned fishing line guide.

One aspect of the present disclosure provides a fishing line guide which is attached to a fishing rod and guides a fishing line. A fishing line guide according to an exemplary embodiment includes a guide ring through which a fishing line passes, a support leg connected to the guide ring at an upper end, and an attachment foot extending from a lower end of the support leg and configured to be attached to a fishing rod. The attachment foot has a base end adjoining the lower end of the support leg and a leading end located opposite the base end. The attachment foot includes a slit portion and a pair of convex portions. The slit portion is perforated in the attachment foot along a central axis of the attachment foot from the base end toward the leading end. The pair of the convex portions are located at the slit portion and protrude toward the central axis respectively.

In an embodiment, at least a portion of each of the pair of the convex portions is located between the leading end and a line segment which joins both outermost ends of a joint portion located between the attachment foot and the lower end of the support leg.

In an embodiment, the slit portion has a first slit located along the central axis of the attachment foot between the leading end and the pair of the convex portions. A maximum width of the attachment foot is three times or more and four times or less of a distance between two points at which a line, which passes a maximum width of the first slit and is perpendicular to the central axis, meets an edge of the first slit and an edge of the attachment foot.

In an embodiment, the slit portion has a first slit and a second slit which are located along the central axis of the attachment foot between the leading end and the base end. The second slit has a width less than a width of the first slit.

In an embodiment, the slit portion extends from the base end up to the leading end, and the attachment foot is divided by the slit portion.

In an embodiment, the pair of the convex portions are at least partially in contact with each other along the central axis of the attachment foot.

In an embodiment, the support leg includes a pair of first support legs extending from the guide ring respectively, and a single, second support leg extending from the guide ring. The attachment foot extends from lower ends of the pair of the first support legs. The fishing line guide includes another attachment foot which extends from a lower end of the second support leg and is configured to be attached to the fishing rod. Said another attachment foot includes a pair of concave portions which have a contour shape coinciding with a portion of a contour shape of the pair of the convex portions.

In an embodiment, the pair of the convex portions include a work-hardened portion which is created by plastic deformation. However, a portion of the attachment foot, which is located adjacent to the slit portion except the pair of the convex portions, does not include a work-hardened portion.

Another aspect of the present disclosure provides a blank for manufacturing the fishing line guides according to the aforementioned embodiments. A blank for a fishing line guide according an exemplary embodiment includes a ring portion, a pair of first support leg portions extending from the ring portion, and a first attachment foot portion extending from a free end of each of the pair of the first support leg portions. The first attachment foot portion has a base end which adjoins the free end of each of the pair of the first support leg portions, and a leading end which is located opposite the base end. The first attachment foot portion includes a slit portion and a pair of convex portions. The slit portion is perforated in the first attachment foot portion along a central axis of the first attachment foot portion from the base end toward the leading end. The pair of the convex portions are located at the slit portion and protrude toward the central axis respectively.

In an embodiment, the blank further includes a single, second support leg portion extending from the ring portion between the first support leg portions, and a second attachment foot portion extending from a free end of the second support leg portion. The second attachment foot portion has a shape which coincides in shape with the slit portion and the pair of the convex portions.

In an embodiment, the slit portion extends from the base end up to the leading end, and the first attachment foot portion is divided by the slit portion.

A further aspect of the present disclosure provides a fishing rod which includes the fishing line guide of the aforementioned embodiments, or the fishing line guide manufactured from the blank of the aforementioned embodiments.

The fishing line guide according to one embodiment includes the slit portion which is perforated along the central axis, and a pair of the convex portions which are located at the slit portion and protrude in a direction perpendicular to the central axis. When compared with an attachment foot without the slit portion and a pair of the convex portions, the attachment foot having the slit portion and a pair of the convex portions has a broader width. The slit portion of the attachment foot receives an adhesive which is applied on a winding thread for firmly fixing the attachment foot to the fishing rod.

The adhesive received in the slit portion is hardened and thereafter functions as an anchor, preventing the fishing line guide from being moved away from the attachment position due to an external force. Thus, with respect to the torsion which occurs in the attachment foot due to the loads applied by the fishing line during casting a fishing rig or landing a fish, the torsion-resistance strength of a portion of the attachment foot, which withstands the torsion, can be improved.

Further, the attachment foot of the fishing line guide according to one embodiment includes, in a pair of the convex portions, the work-hardened portion which is created by plastic deformation. Since a pair of the convex portions include the work-hardened portion and the slit portion is formed in the attachment foot, the attachment foot of the fishing line guide according to one embodiment excludes the press working of the prior art which causes the entire attachment foot to be work-hardened so as to close the slit portion. That is, the fishing line guide according to one embodiment can be formed by press working which uses a small pressure and causes small deformation. Accordingly, the service life of a metallic die used for the press working can be increased, the productivity of the fishing line guide can be improved, and the fishing line guide can be manufactured at a reduced manufacturing cost.

Further, the fishing line guide according to one embodiment can accomplish the aforementioned improvement of torsion-resistance strength without an increase in weight.

BRIEF DESCRIPTION OF THE DRAWINGS

FIG. 22A is a perspective view showing a fishing line guide having a single attachment foot according to a third embodiment.

FIG. 22B is a perspective view showing a fishing line guide having a single attachment foot according to a third embodiment.

FIG. 23B is a perspective view showing a fishing line guide having a single attachment foot according to a fourth embodiment.

DETAILED DESCRIPTION

Figure 1:
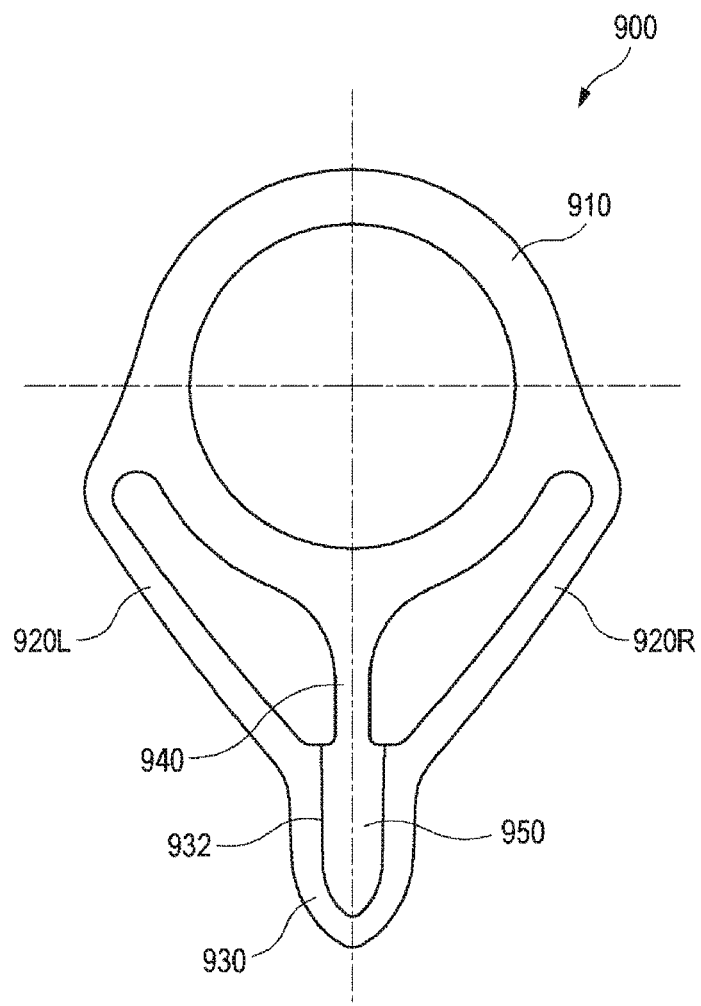
FIG. 1 shows a blank for manufacturing a fishing line guide of the prior art.
Figure 2A:
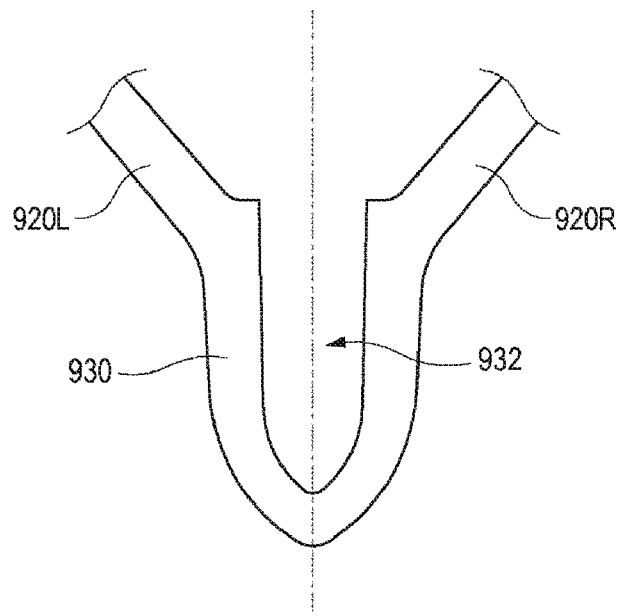
FIG. 2A shows a first attachment foot portion of the blank shown in FIG. 1.
Figure 2B:
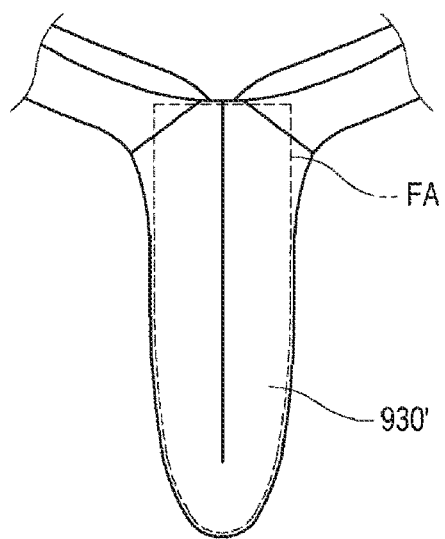
FIG. 2B shows a first attachment foot which is formed from the first attachment foot portion of the blank shown in FIG. 1.
Figure 3A:
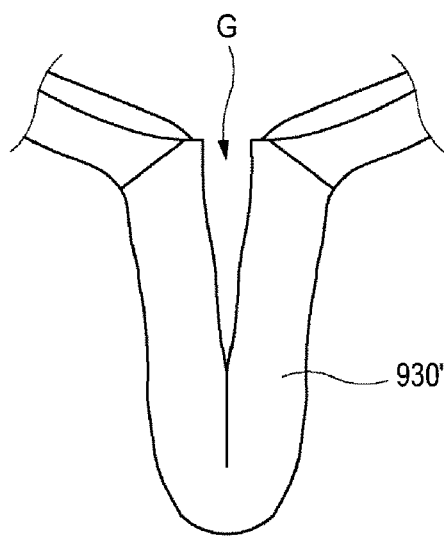
FIG. 3A shows an example of defects which occur in an attachment foot of a fishing line guide of the prior art.
Figure 3B:
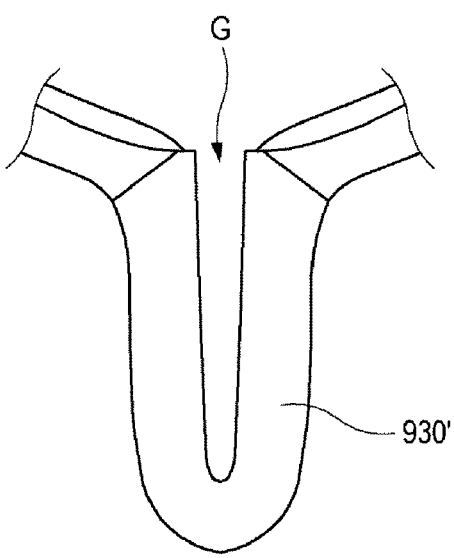
FIG. 3B shows another example of defects which occur in an attachment foot of a fishing line guide of the prior art.

Descriptions are made as to embodiments of a fishing line guide, a blank for manufacturing a fishing line guide, and a fishing rod with reference to the accompanying drawings. In the accompanying drawings, like reference numerals denote like or corresponding elements or parts. The directional term 'upward,' 'upper' or the like as used herein is based on a direction in which a guide ring is positioned with respect to an attachment foot, while the directional term 'downward,' 'lower' or the like means a direction opposite to the upward or upper direction.

Figure 4:
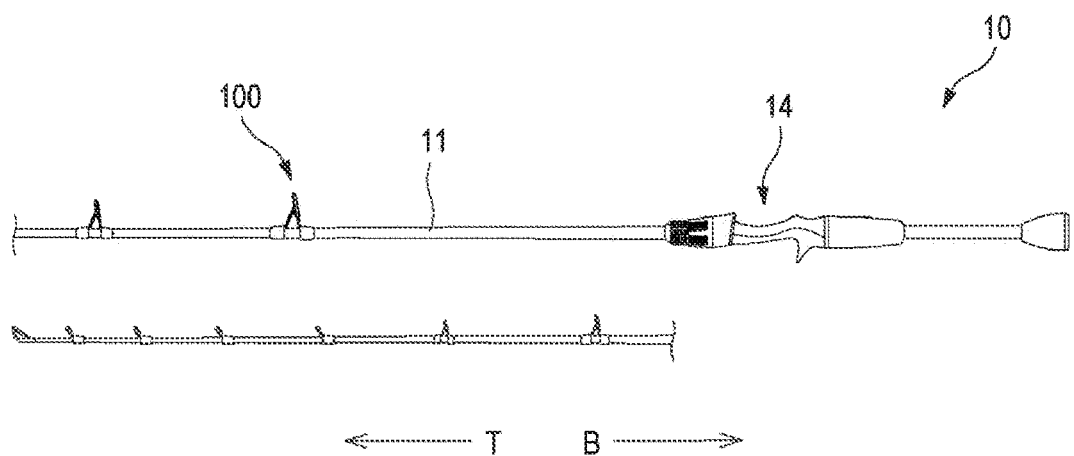
FIG. 4 is a side view showing a fishing rod according to one embodiment which includes a fishing line guide according to one embodiment.

FIG. 4 shows a fishing rod 10 according to one embodiment. In FIG. 4, an arrow T shows a direction directed to a tip of a fishing rod, while an arrow B shows a direction directed to a butt of the fishing rod. The fishing rod 10 may consists of a single rod or a plurality of partial rods. The fishing rod 10 has a reel seat 14 for attachment of a reel in the vicinity of the butt of the fishing rod. Further, the fishing rod 10 includes a fishing line guide which is attached to a fishing rod portion 11 and guides a fishing line. The fishing rod 10 includes at least one of the fishing line guides according to the embodiments described below.

FIGS. 5 to 23B show various embodiments of the fishing line guide. The fishing line guides include one or more attachment feet for attachment to the fishing rod.

Figure 8:
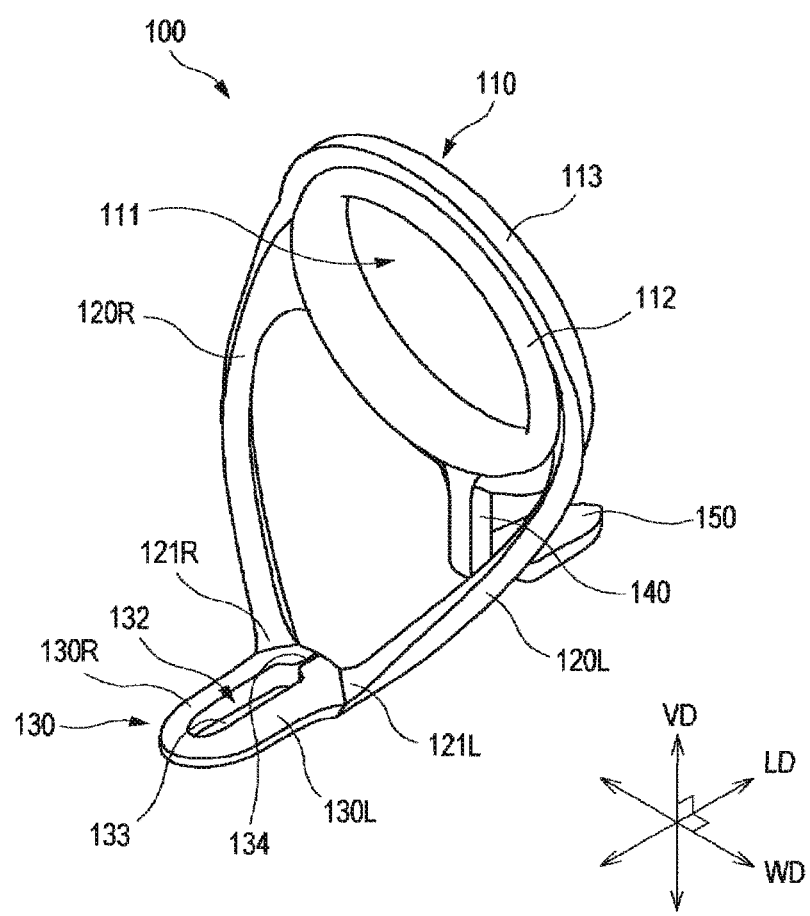
FIG. 8 is a perspective view showing the fishing line guide according to the first embodiment.
Figure 20:
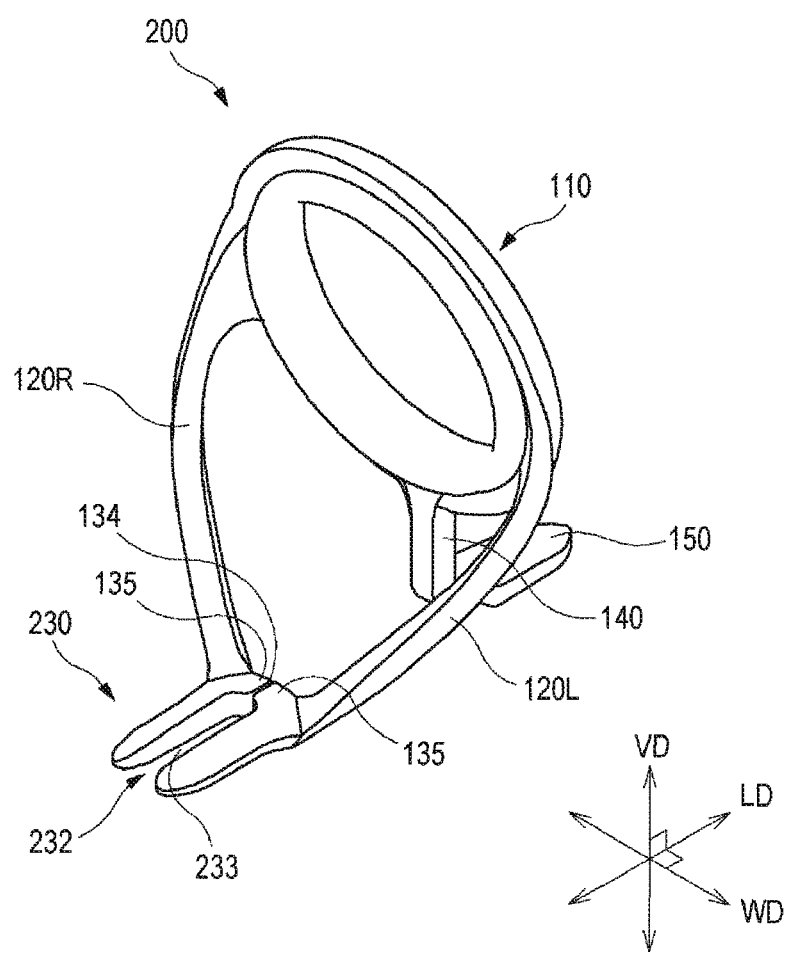
FIG. 20 is a perspective view showing a fishing line guide according to a second embodiment.

The fishing line guides 100 and 200 according to the embodiments shown in FIGS. 8 and 20 include two attachment feet (a first attachment foot 130, 230 and a second attachment foot 150). The fishing line guides of these embodiments may be referred to as a 'double-foot fishing line guide' in the technical field. The fishing line guides of these embodiments include a pair of first support legs 120L and 120R coupled to the first attachment foot 130, 230, and a single, second support leg 140 coupled to the second attachment foot 150.

The fishing line guides 300A, 300B, 400A and 400B according to the embodiments shown in FIGS. 22A to 23B include a single attachment foot 330A, 330B, 430A, 430B. The fishing line guides of these embodiments may be referred to as a 'single-foot fishing line guide' in the technical field. The fishing line guides of these embodiments include a pair of support legs 120L and 120R, 420L and 420R coupled to said single attachment foot.

The first attachment foot 130, 230 and the attachment foot 330A, 330B, 430A, 430B of the fishing line guides shown in FIGS. 5 to 23B include a slit portion 132, 232 and a pair of convex portions 135, which are described below.

Figure 5:
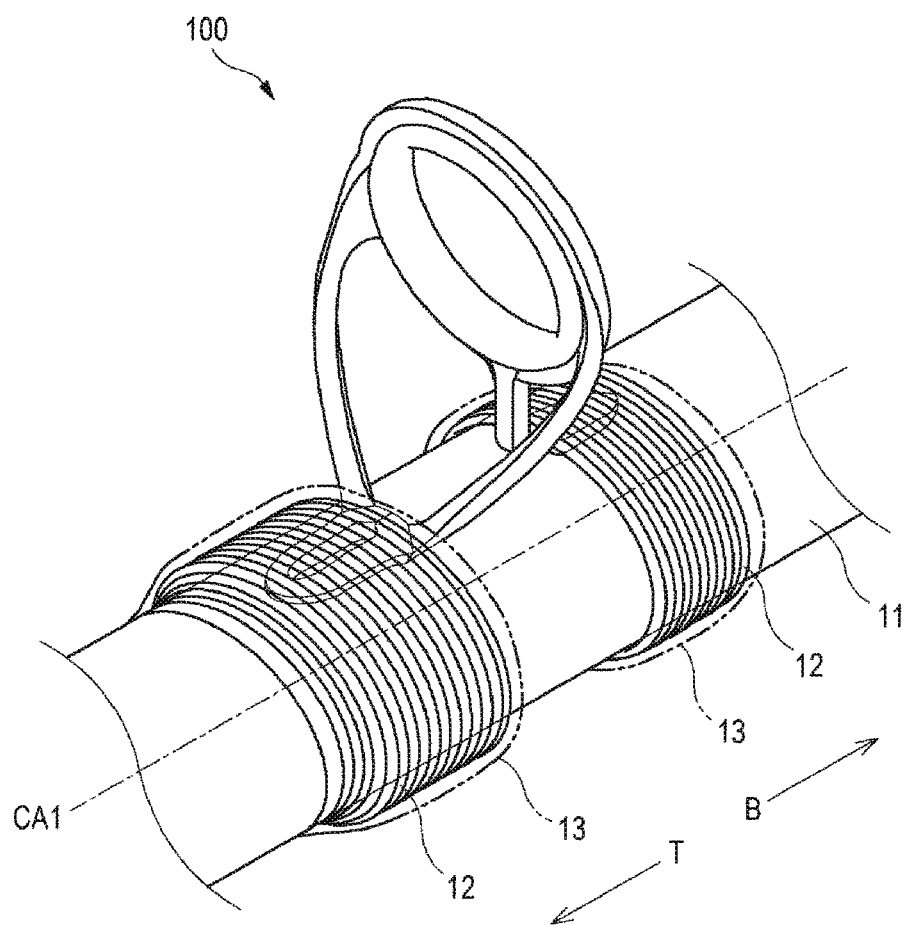
FIG. 5 is a perspective view showing that a fishing line guide according to a first embodiment is attached to a fishing rod.
Figure 6:
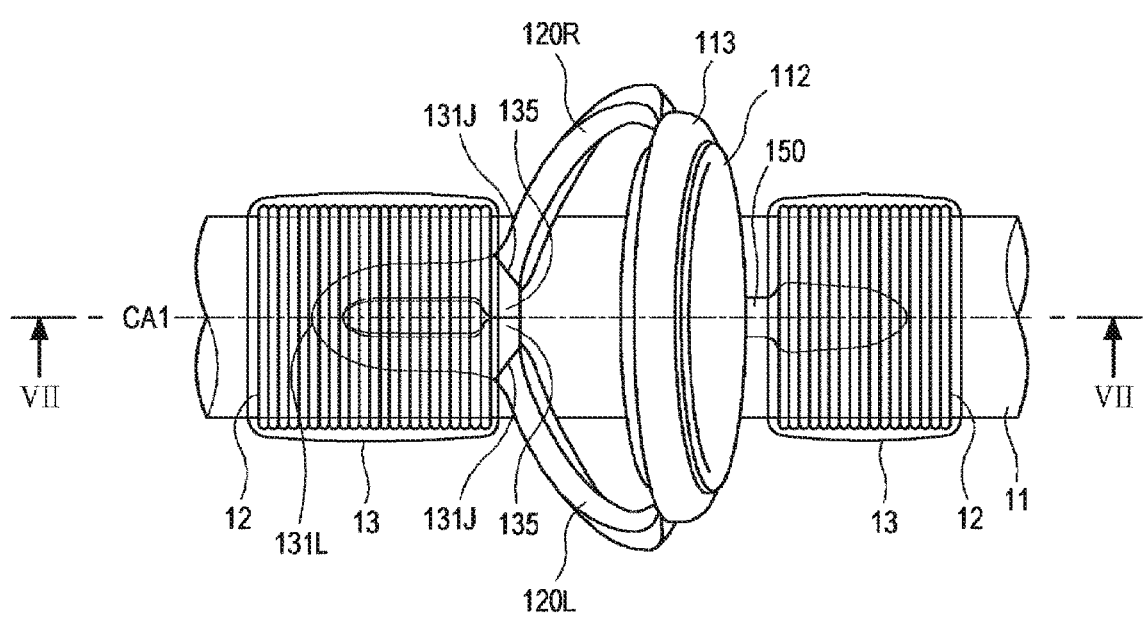
FIG. 6 is a top view showing that the fishing line guide according to the first embodiment is attached to the fishing rod.
Figure 7:
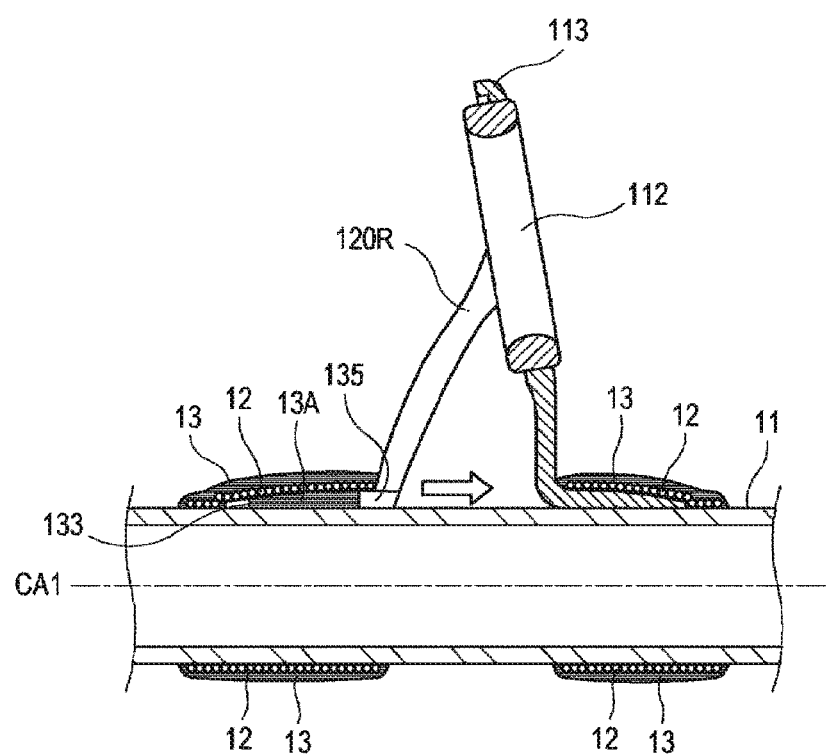
FIG. 7 is a sectional view taken along the line VII-VII of FIG. 6.

As shown in FIGS. 5 to 7, the attachment foot of the fishing line guide may be firmly fixed to the fishing rod by a winding thread 12. That is, the attachment foot is firmly fixed to the fishing rod portion 11 by bringing the attachment foot into contact with an outer surface of the fishing rod portion 11 and then densely winding the winding thread 12 around the attachment foot and the fishing rod portion 11 at which the attachment portion is positioned. After the winding thread 12 is wound, an adhesive is applied on the wound winding thread 12. If the adhesive is hardened, then an adhesive coating 13 is formed throughout the wound winding thread 12. The adhesive coating 13 prevents unwinding of the winding thread 12, fills in gaps between the adjacent winding thread 12, and gives decorativeness to the fishing rod.

First Embodiment

FIGS. 5 to 19 show the fishing line guide 100 according to a first embodiment, which has two attachment feet. Referring to FIG. 8, the fishing line guide 100 of the first embodiment includes: a guide ring 110 through which a fishing line passes; a pair of first support legs 120L and 120R and a second support leg 140 which extend from the guide ring 110; and a first attachment foot 130 and a second attachment foot 150 which extend from the first support legs 120L and 120R and the second support leg 140 respectively. The fishing line guide 100 may be manufactured by press working (bending, drawing, etc.) a blank which is obtained by press working (punching, blanking, etc.) a metallic sheet.

Referring to FIGS. 8 to 12, the guide ring 110 has therein a circular or elliptical opening 111 through which the fishing line passes. In this embodiment, the guide ring 110 has a retaining ring 113 which retains a hard ring 112. The hard ring 112 contacts the fishing line, and has the circular opening 111 therein. The hard ring 112 is made of a hard material having superior wear resistance. The retaining ring 113 is approximately circular. The hard ring 112 is fitted to an inner circumferential surface of the retaining ring 113 and is thus retained by the retaining ring 113. By way of another example, the hard ring 112 may have an elliptical shape, and the retaining ring 113 may have an elliptical shape that conforms to the elliptical shape of the hard ring 112. In another embodiment, the guide ring 110 may be formed as a single, ring-shaped part insofar as required strength, hardness, wear resistance and the like are satisfied.

Figure 11:
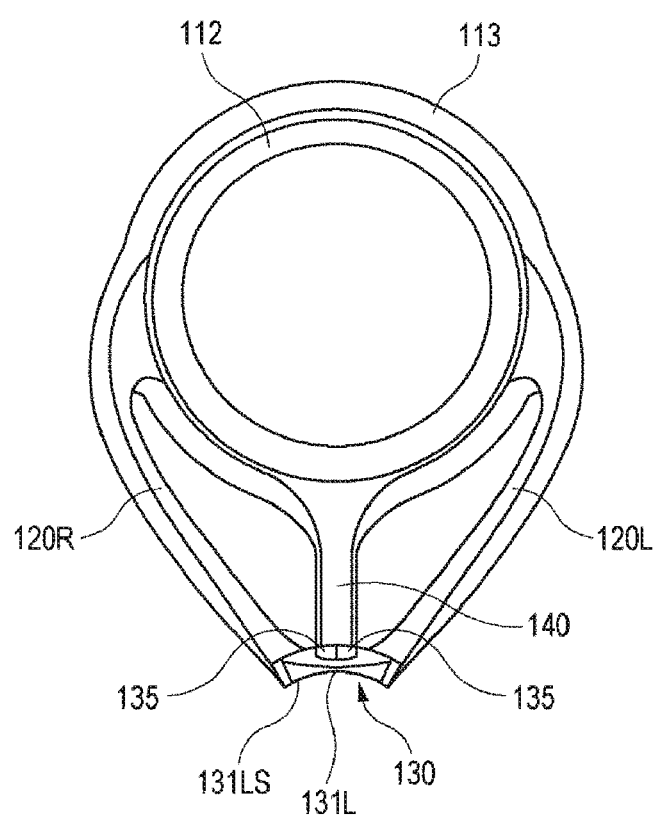
FIG. 11 is a rear view of the fishing line guide shown in FIG. 8.

A pair of the first support legs 120L and 120R are connected to the guide ring 110 at their upper ends. A pair of the first support legs 120L and 120R get closer to each other in the vicinity of their lower ends, and are connected to the first attachment foot 130. The first attachment foot 130 extends from the lower ends 121L and 121R of the respective support legs 120L and 120R. The first attachment foot 130 has a lower surface 131LS which is brought into contacted with the outer surface of the fishing rod portion 11, and an upper surface 131US which is located opposite the lower surface 131LS in a vertical direction VD (or in a thickness direction of the first attachment foot 130). As shown in FIG. 11, the lower surface 131LS of the first attachment foot 130 includes a roundly concave surface.

Figure 9:
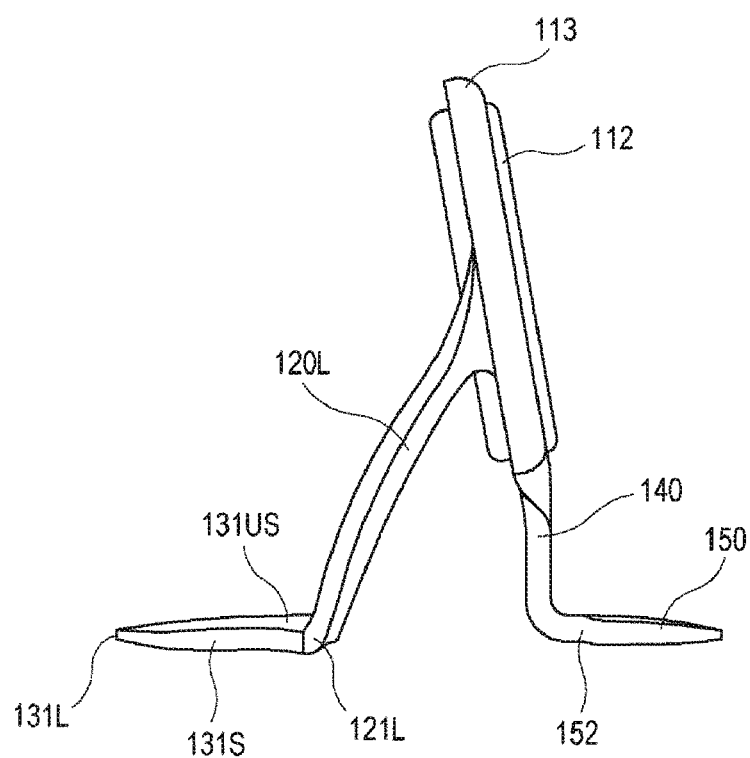
FIG. 9 is a side view of the fishing line guide shown in FIG. 8.
Figure 10:
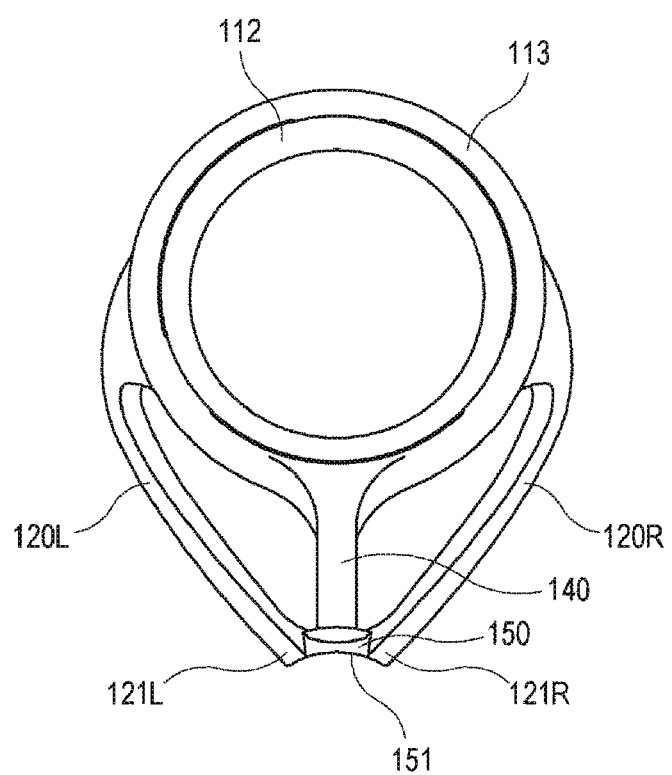
FIG. 10 is a front view of the fishing line guide shown in FIG. 8.
Figure 12:
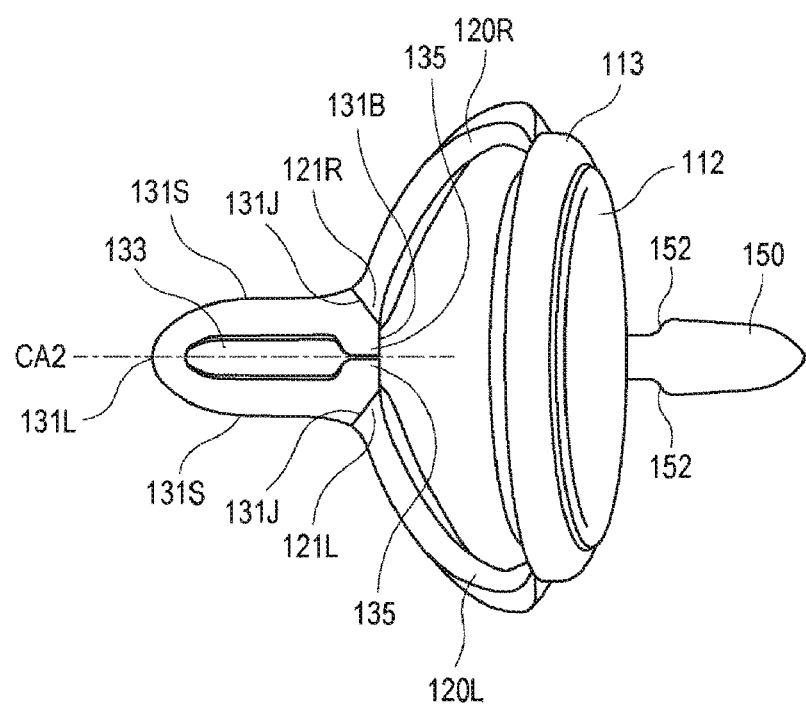
FIG. 12 is a top view of the fishing line guide shown in FIG. 8.

The second support leg 140 is connected to the guide ring 110 at its upper end, and is connected to the second attachment foot 150 at its lower end. The second attachment foot 150 extends from the lower end of the second support leg 140. The second attachment foot 150 has a lower surface 151 which is brought into contact with the outer surface of the fishing rod portion 11. As shown in FIG. 10, the lower surface 151 of the second attachment foot 150 includes a roundly concave surface. As shown in FIGS. 9 and 12, the second attachment foot 150 includes a pair of concave portions 152 which are located adjacent to the lower end of the second support leg 140. Referring to FIG. 12, a pair of the concave portions 152 of the second attachment foot 150 has a contour shape which coincides with a portion of a contour shape of a pair of the convex portions 135 of the first attachment foot 130.

Torsion may occur in the first attachment foot 130 due to the load which is applied to the guide ring 110 by the fishing line during casting a fishing rig or landing a fish.

Referring to FIGS. 8 and 12 to 15, the first attachment foot 130 has a base end 131B which adjoins the lower ends 121L and 121R of the first support legs, and a leading end 131L which is located opposite the base end 131B along a central axis CA2 of the first attachment foot 130. Further, the first attachment foot 130 has joint portions 131J which adjoin the base end 131B and become an intersection between the lower ends 121L and 121R of the first support legs and the first attachment foot 130, and side ends 131S which are located laterally in the first attachment foot 130. As shown in FIG. 12, when the fishing line guide 100 is viewed from a top view, the side ends 131S have an approximately U-like shape.

Referring to FIG. 8, the first attachment foot 130 includes a slit portion 132, and a portion of the first attachment foot 130 in a longitudinal direction LD is divided due to the slit portion 132. The slit portion 132 is perforated in the first attachment foot 130 in the thickness direction of the first attachment foot 130 (i.e., in the vertical direction VD passing through the lower and upper surfaces of the first attachment foot 130) along the central axis CA2 from the base end 131B toward the leading end 131L. The first attachment foot 130 has a left half 130L and a right half 130R which extend from the lower ends 121L and 121R of the first support legs 120L and 120R respectively. When the fishing line guide 100 is viewed from the top (see FIG. 12), the left half 130L and the right half 130R are symmetrical with respect to the central axis CA2.

Referring to FIGS. 8 and 12 to 15, the first attachment foot 130 includes a pair of convex portions 135 which are located at the slit portion 132 and protrude toward the central axis CA2 respectively. Each convex portion 135 is located at each lateral side of the slit portion 132. Each convex portion 135 has a base end surface 135B, a leading end surface 135L and an intermediate surface 135M. The base end surface 135B adjoins the base end 131B. The leading end surface 135L is located opposite the base end surface 135B along the central axis CA2. The intermediate surface 135M is located between the base end surface 135B and the leading end surface 135L. The base end surface 135B of each convex portion 135 forms the base end 131B of the first attachment foot 130. That is, a pair of the convex portions 135 extend from the base end 131B of the first attachment foot 130 toward the leading end 131L, and protrude toward the central axis CA2 perpendicularly to the central axis CA2. The base end surface 135B and the intermediate surface 135M form a right angle therebetween. The intermediate surface 135M includes a flat surface. Alternatively, the intermediate surface 135M may include a curved surface. The intermediate surface 135M and the leading end surface 135L are connected to each other via a roundly curved surface. The leading end surface 135L is inclined at an acute angle with respect to the central axis CA2. Alternatively, the leading end surface 135L may be located perpendicularly to the central axis CA2. A contour shape of each convex portion 135 at the leading end surface 135L and the intermediate surface 135M coincides with the contour shape of the concave portion 152 of the second attachment foot 150.

Due to a pair of the convex portions 135, the slit portion 132 includes a first slit 133 and a second slit 134 which are located between the leading end 131L and the base end 131B along the central axis CA2 and have widths different from each other. The first slit 133 is a space which is located between the leading end 131L and a pair of the convex portions 135 along the central axis CA2 in the slit portion 132. Further, the first slit 133 may be a space which is formed by excluding the second slit 134 from the slit portion 132. The second slit 134 connects with the first slit 133 and has the width less than the width of the first slit 133.

Figure 15:
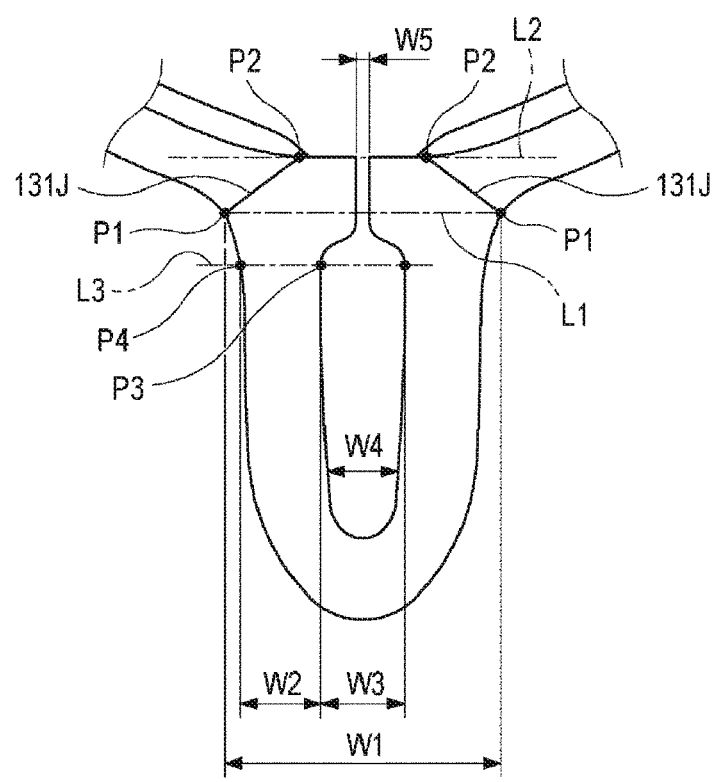
FIG. 15 is similar to FIG. 13, illustrating a width of the attachment foot and a width of the slit.

The second slit 134 is a space which is located between the intermediate surfaces 135M of the respective convex portions 135. A transition portion 133T, a width of which gradually increases toward the leading end 131L, is formed between the first slit 133 and the second slit 134. Where the leading end surface 135L of each convex portion 135 is perpendicular to the central axis CA2, the slit portion 132 may not have the transition portion 133T. The second slit 134 extends from the base end 131B toward the leading end 131L, and the first slit 133 extends from the transition portion 133T toward the leading end 131L. Referring to FIG. 15, the first slit 133 has the width W4 greater than the width W5 of the second slit 134. In this regard, the width of each slit means the shortest distance between two points which are located at edges of each slit in a direction perpendicular to the central axis CA2. A pair of the convex portions 135 are spaced apart from each other by the width W5 of the second slit 134.

Figure 13:
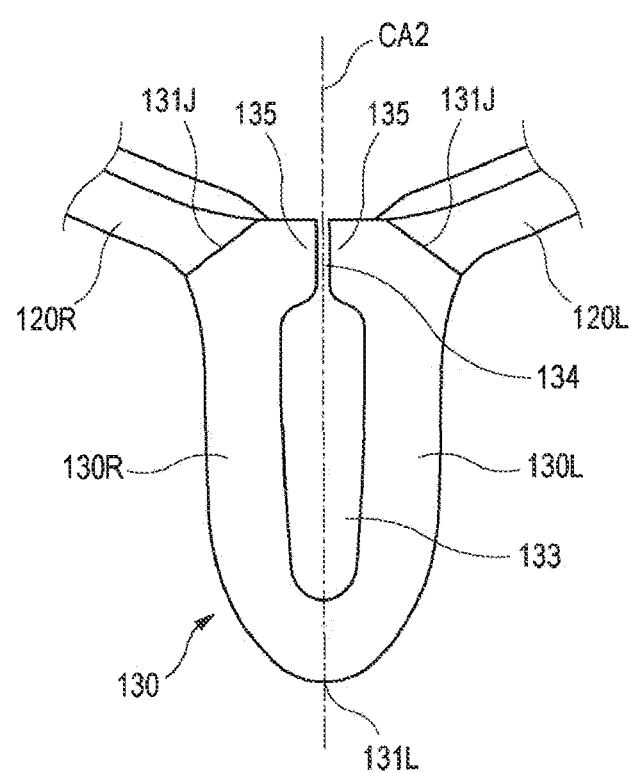
FIG. 13 is a top view showing an attachment foot of the fishing line guide according to the first embodiment.
Figure 14:
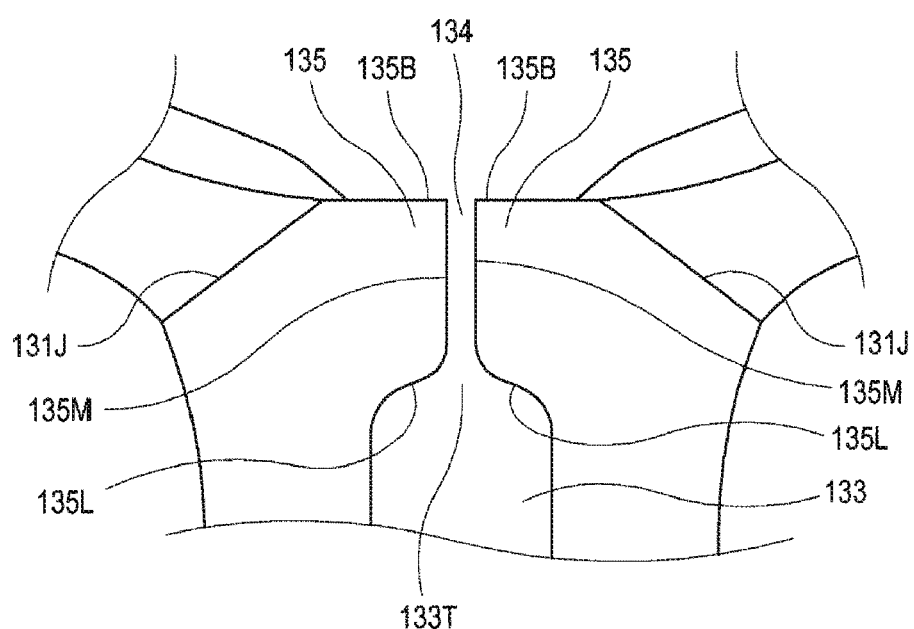
FIG. 14 is a top view showing a slit portion and convex portions of the attachment foot shown in FIG. 13.

As shown in FIGS. 13 and 14, when the fishing line guide 100 is viewed from the top, the slit portion 132 has S-shaped edges at the transition portion 133T, and has a U-shaped edge at an end region of the first slit 133 which is distant from the second slit 134. Further, since each convex portion 135 is located adjacent to the base end 131B in the slit portion 132, the edges of the slit portion 132 includes a portion of an edge of each convex portion 135.

As shown in FIGS. 13 to 15, when the fishing line guide 100 is viewed from the top, a portion of each convex portion 135 is located between a line segment L1 and the leading end 131L of the first attachment foot 130 (herein, the line segment L1 is a line segment joining both outermost ends P1 of the joint portions 131J). That is, a portion or the entire leading end surface 135L of each convex portion 135, or the entire leading end surface 135L and a portion of the intermediate surface 135M is located between the line segment L1 and the leading end 131L. Thus, when the winding thread 12 is wound around the first attachment foot 130, the winding thread 12 can be wound on the aforementioned portions of each convex portion 135. The base end 131B of the first attachment foot 130 is located on a line L2 which passes both innermost ends P2 of the joint portions 131J.

As shown in FIGS. 14 and 15, the width W4 of the first slit 133 is greater than the width W5 of the second slit 134. The width W4 of the first slit 133 narrows gradually toward the leading end 131L. A maximum width W3 of the first slit 133 is located adjacent to the leading end surfaces 135L of the convex portions 135 (e.g., at the transition portion 133T). The location of the maximum width W3 of the first slit 133 may change depending upon the pressure of press-working for forming the first attachment foot. By way of another example, the width W4 of the first slit 133 may widen gradually toward the leading end 131L, and the maximum width W3 of the first slit 133 may be located adjacent to a leading end of the first slit 133.

If the adhesive is applied to the winding thread 12 which is wound around the first attachment foot 130 and the fishing rod portion 11 and firmly fixes the fishing line guide 100 to the fishing rod, the adhesive flows into the first slit 133 and the first slit 133 receives the adhesive. The adhesive received in the first slit 133 is hardened in the first slit 133, thereby forming a hard structure together with the adhesive which covers all of the first attachment foot 130 and the winding thread 12 and is then hardened. Since the first slit 133 is perforated in the first attachment foot 130 in the thickness direction, the adhesive, which is received and hardened in the first slit 133, functions as an anchor that causes the first attachment foot 130 to be fixed.

As shown in FIGS. 12, 13 and 15, the width of the first attachment foot 130 (a distance between both side ends 131S in a direction perpendicular to the central axis CA2 when the fishing line guide 100 is viewed from the top) gradually decreases toward the leading end 131L. In this embodiment, a maximum width W1 of the first attachment foot 130 is located on the line segment L1 joining both outermost ends P1 of the joint portions 131J. The maximum width W1 of the first attachment foot 130 may be determined in the range of three times or more and four times or less of a distance W2 between a point P3 and a point P4 (i.e., a width of the left half 130L or the right half 130R in a line L3) The line L3 is perpendicular to the central axis CA2 and passes the maximum width W3 of the first slit 133. The line L3 meets the edge of the first slit 133 at the point P3, and meets the edge of the first attachment foot 130 at the point P4. Where the maximum width W1 of the first attachment foot 130 exceeds four times of the distance W2, the second attachment foot 150 has a relatively broader width, thus leading to the weight increase of the fishing line guide 100. Further, the maximum width W1 of the first attachment foot 130 can be greater than an average diameter of the fishing rod. Then, the winding thread 12 cannot be easily wound around the first attachment foot 130, and the appearance of the fishing rod is harmed. Where the maximum width W1 of the first attachment foot 130 is less than three times of the distance W2, the width of the first slit 133 is narrowed and the adhesive to be applied on the winding thread 12 fails to smoothly flow into the adhesive coating 131. Thus, the aforementioned anchor function cannot be sufficiently utilized. Further, since sizes of a pair of the convex portions 135 become smaller, a pair of the convex portions 135 may collapse by the press working depending upon the intensity of the pressure during the press working, and the slit portion 132 cannot be formed. Further, the maximum width W3 of the first slit 133 may be equal to the distance W2 between the point P3 and the point P4 located on the line L3, or equal to or less than two times of the distance W2 between the point P3 and the point P4 located on the line L3. In another embodiment, the first attachment foot 130 may have a maximum width between the line segment L1 and the first slit 133.

Figure 16:
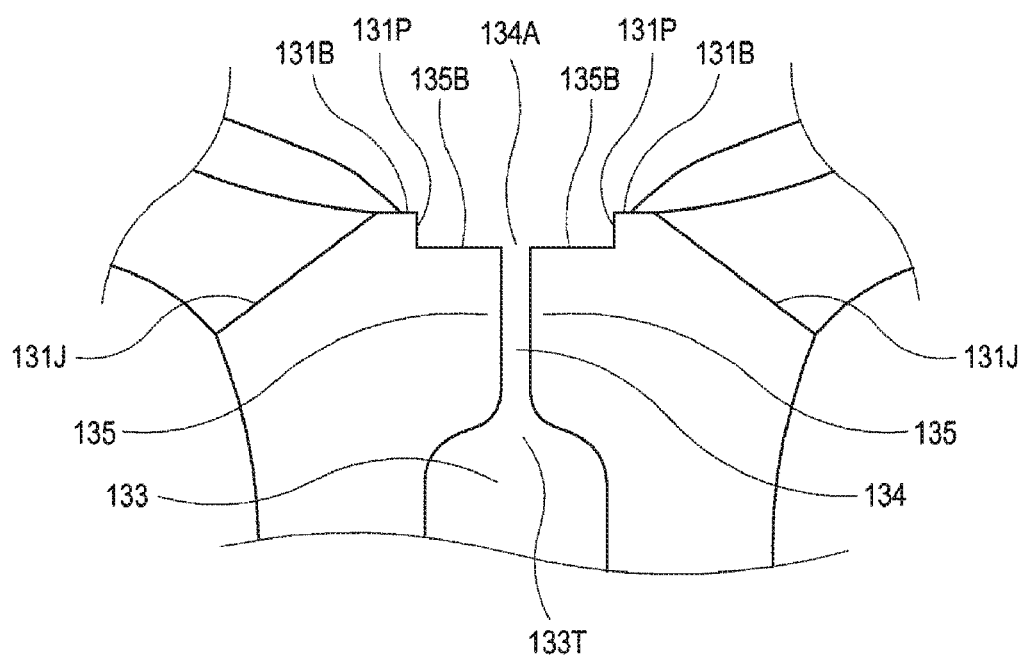
FIG. 16 is a top view showing another example of the convex portions.

FIG. 16 shows another example of a pair of the convex portions. A pair of the convex portions 135 are spaced apart from the base end 131B of the first attachment foot. Thus, a stepwise portion 131P is formed between the base end surface 135B of each convex portion 135 and the base end 131B of the first attachment foot 130. Due to the stepwise portion 131P, the slit portion 132 has an additional slit 134A between the second slit 134 and the base end 131B. Further, the edge of the slit portion 132 includes all of the edge of each convex portion 135.

Figure 17:
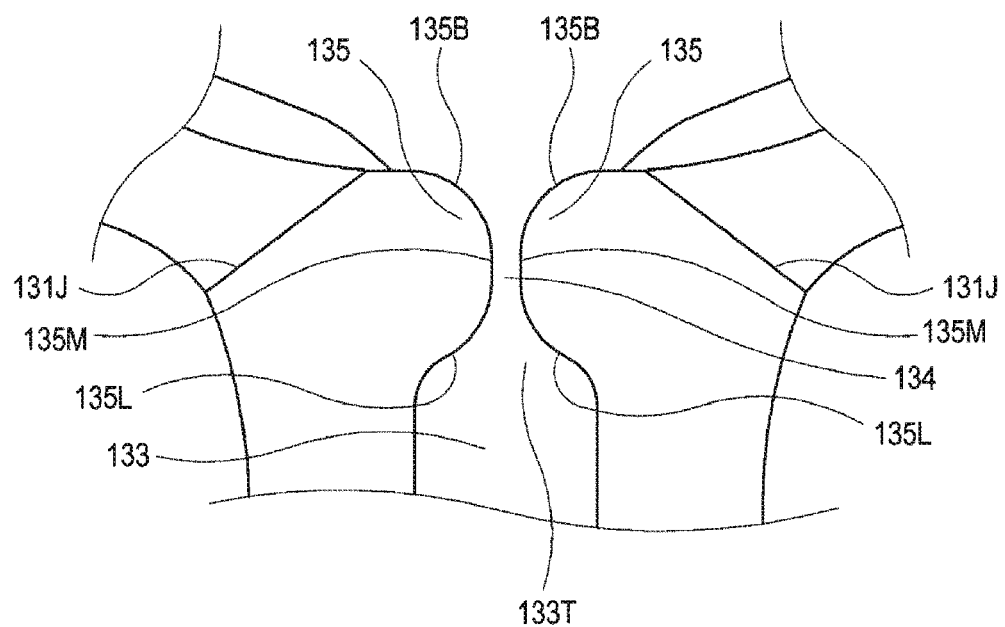
FIG. 17 is a top view showing a further example of the convex portions.

FIG. 17 shows a further example of a pair of the convex portions. The base end surface 135B and the intermediate surface 135M of each convex portion 135 are connected via a curved surface.

Figure 18:
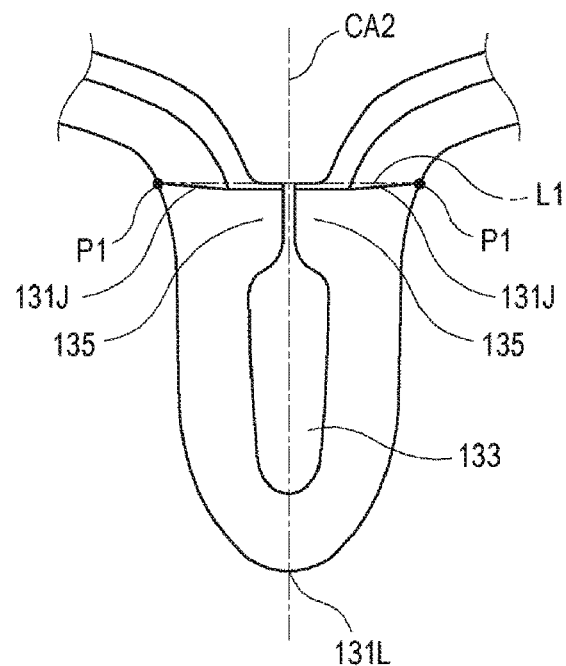
FIG. 18 is a top view showing a yet another example of the convex portions.

FIG. 18 shows a yet another example of a pair of the convex portions. The entirety of a pair of the convex portions 135 is located between the leading end 131L and the line segment L1 which joins both outermost ends P1 of the joint portions 131J. According to the example shown in FIG. 18, when the winding thread 12 is wound on the first attachment foot 130 to firmly fix the fishing line guide 100 to the fishing rod portion 11, the winding thread 12 can be wound on the entirety of the pair of the convex portions 135.

Figure 19:
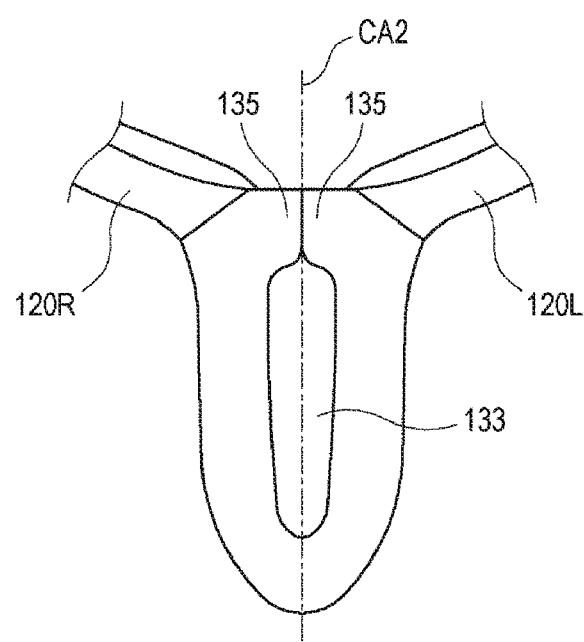
FIG. 19 is a top view showing a still another example of the convex portions.

FIG. 19 shows a still another example of a pair of the convex portions. A pair of the convex portions 135 can be in contact with each other at least partially along the central axis CA2. That is, a pair of the convex portions 135 can be in contact with each other at a portion or the entirety of each intermediate surface 135M of each convex portion. In such an example, the slit portion 132 may not have the second slit 134 which is formed between the intermediate surfaces 135M of a pair of the convex portions 135.

According to the fishing line guide 100 of one embodiment, since a pair of the convex portions 135 and the slit portion 132 are located along the central axis CA2, the first attachment foot 130 has a width greater than a width of an attachment foot which has not included the above-described slit portion and convex portions. Thus, the first attachment foot 130 has an improved torsional resistance force.

At least a portion of each convex portion 135 is located between the leading end 131L and the line segment L1 joining both outermost ends P1 of the joint portions 131J. Thus, as shown in FIG. 6, when the winding thread 12 for firmly fixing the fishing line guide 100 to the fishing rod 10 is wound around the first attachment foot 130 and the fishing rod portion 11, the winding thread 12 can be wound around the fishing rod portion 11 and at least a portion of the each convex portion 135. The winding thread 12 can be wound around the first attachment foot 130 and the fishing rod portion 11 while passing both outermost ends of the joint portions 131J and the pair of convex portions 135, i.e., while passing the maximum width W1 of the first attachment foot 130. Thus, due to the winding thread 12 passing the maximum width of the first attachment foot 130, the fishing line guide 100 has a strong torsional resistance force. Further, if the winding thread 12 is wound around the fishing rod portion 11 and the first attachment foot 130 and thereafter the adhesive is applied on the wound winding thread 12, the adhesive enters the first slit 133 of the first attachment foot 130 and fills in the first slit 133, and the first slit 133 receives the adhesive. As shown in FIG. 7, if the adhesive filling in the first slit 133 is hardened, the adhesive in the first slit 133 forms an adhesive anchor 13A which is firmly fixed to the fishing rod portion 11 and can be integrally formed with the adhesive coating 13. Thus, the adhesive anchor 13A in the first slit 133 prevents the fishing line guide 100 from being moved away from the attachment position in a direction of an arrow shown in FIG. 7 due to an external force applied to the fishing line guide 100.

<Manufacture Processes>

Figure 24:
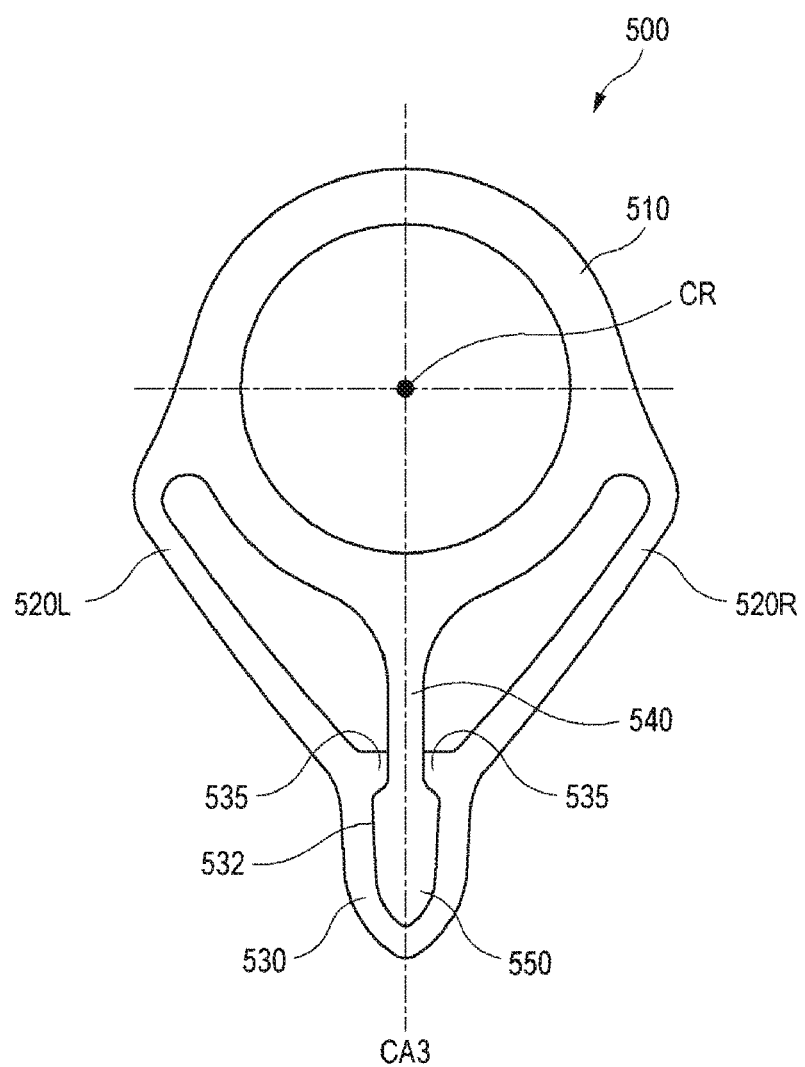
FIG. 24 shows an example of a blank for manufacturing the fishing line guide according to the first embodiment.

FIG. 24 shows an example of a blank for manufacturing the above-described fishing line guide 100 of the first embodiment. FIGS. 25A to 25D show an example of manufacturing the first attachment foot 130 of the fishing line guide 100 from the blank shown in FIG. 24.

The blank 500 shown in FIG. 24 is obtained by press working (e.g., punching, blanking, etc.) a metallic sheet. The blank 500 includes a ring portion 510, a pair of first support leg portions 520L and 520R, a first attachment foot portion 530, a single, second support leg portion 540, and a second attachment foot portion 550. A pair of the first support leg portions 520L and 520R extend from lateral edges of the ring portion 510 respectively. The second support leg portion 540 extends from the ring portion 510 between a pair of the first support leg portions 520L and 520R. The first attachment foot portion 530 extends from respective free ends of a pair of the first support leg portions 520L and 520R, and the second attachment foot portion 550 extends from a free end of the second support leg portion 540. The ring portion 510, the first support leg portions 520L and 520R, the first attachment foot portion 530, the second support leg portion 540 and the second attachment foot portion 550 are formed respectively into the retaining ring 113, the first support legs 120L and 120R, the first attachment foot 130, the second support leg 140 and the second attachment foot 150, which are described above, through press working (bending, drawing, etc.).

Figure 25A:
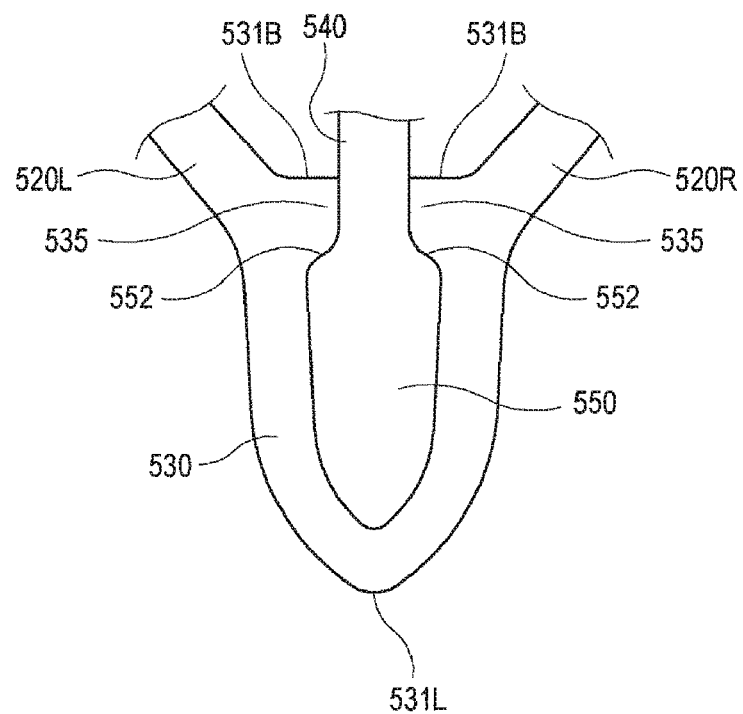
FIG. 25A shows a first attachment foot portion and a second attachment foot portion of the blank shown in FIG. 24.
Figure 25B:
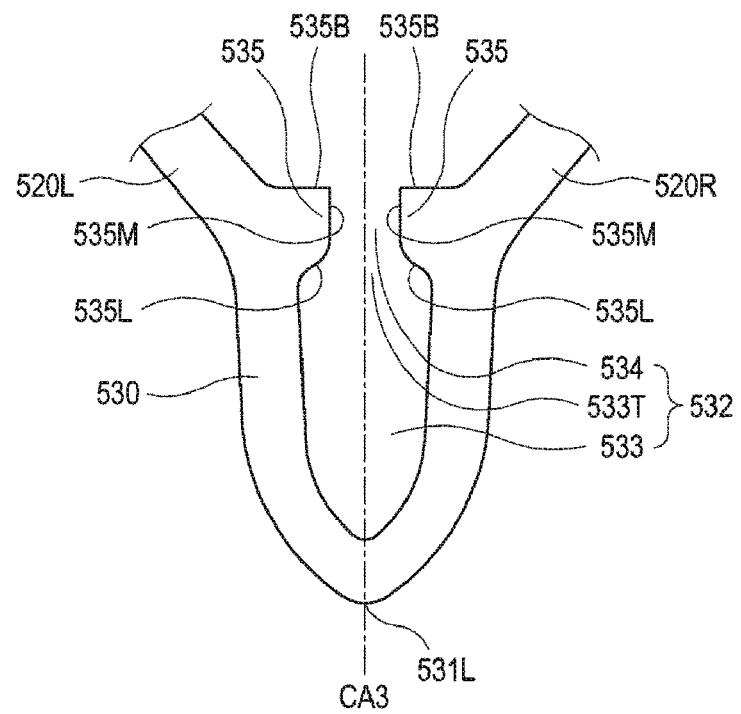
FIG. 25B shows that the second attachment foot portion is separated from the first attachment foot portion.

Referring to FIGS. 24, 25A and 25B, the first attachment foot portion 530 has an approximately U-like shape. The first attachment foot portion 530 has a base end 531B which adjoins a free end of each first support leg portion 520L, 520R, and a leading end 531L which is located opposite the base end 531B along a central axis CA3 of the first attachment foot portion 530 passing a center CR of the ring portion 510. The first attachment foot portion 530 includes a slit portion 532 and a pair of convex portions 535 located at the slit portion 532.

The slit portion 532 is perforated in the first attachment foot portion 530 in a thickness direction (in a direction of passing through front and back surfaces of the first attachment foot portion 530) along the central axis CA3 from the base end 531B toward the leading end 531L. Each convex portion 535 is located adjacent to the base end 531B in the slit portion 532. The convex portions 535 protrude toward the central axis CA3 respectively, and are spaced part from each other by a portion of the slit portion 532 in a direction perpendicular to the central axis CA3. Each convex portion 535 has a base end surface 535B, a leading end surface 535L and an intermediate surface 535M. The base end surface 535B is located at the base end 531B. The leading end surface 535L is located opposite the base end surface 535B along the central axis CA3. The intermediate surface 535M is located between the base end surface 535B and the leading end surface 535L.

In this embodiment, since a pair of the convex portions 535 are located in the slit portion 532, the slit portion 532 includes a first slit 533 and a second slit 534 which are located between the leading end 531L and the base end 531B along the central axis CA3 and have widths different from each other. The first slit 533 is a space which is located between the leading end 531L and a pair of the convex portions 535 along the central axis CA3 in the slit portion 532. The second slit 534 is located adjacent to the base end 531B, and has a width less than a width of the first slit 533. The second slit 534 is a space which is located between the intermediate surfaces 535M of the respective convex portions 535 in the slit portion 532. A transition portion 533T, a width of which gradually increases toward the leading end 531L, is formed between the first slit 533 and the second slit 534. The second slit 534 extends from the base end 531B toward the leading end 531L. The first slit 533 extends from the transition portion 533T toward the leading end 531L, and has a width greater than a width of the second slit 534. The first slit 533 is formed into the above-described first slit 133, and the second slit 534 is formed into the above-described second slit 134. In other embodiment, a pair of the convex portions 535 may be spaced apart from the base end 531B toward the leading end 531L. In such an embodiment, an additional slit connecting with the second slit 534 is formed between the respective convex portions 535.

The second attachment foot portion 550 has a shape which coincides in shape with the slit portion 532 and a pair of the convex portions 535 of the first attachment foot portion 530. The second attachment foot portion 550 has a pair of concave portions 552 at its edge. Each concave portion 552 has a contour shape which coincides with a contour shape of each convex portion 535 at the intermediate surface 535M and the leading end surface 535L. Thus, as shown in FIGS. 24 and 25A, the second attachment foot portion 550 is located in the slit portion 532 in the state where the concave portions 552 coincide in shape with the convex portions 535.

When compared with the blank 900 which is shown in FIG. 1 and has the same size as the blank 500, the blank 500 shown in FIG. 24 has the same weight as the blank 900. Thus, the fishing line guide 100 manufactured from the blank 500 has the first attachment foot 130 which has an improved torsion-resistance strength without an increase in weight.

Figure 25C:
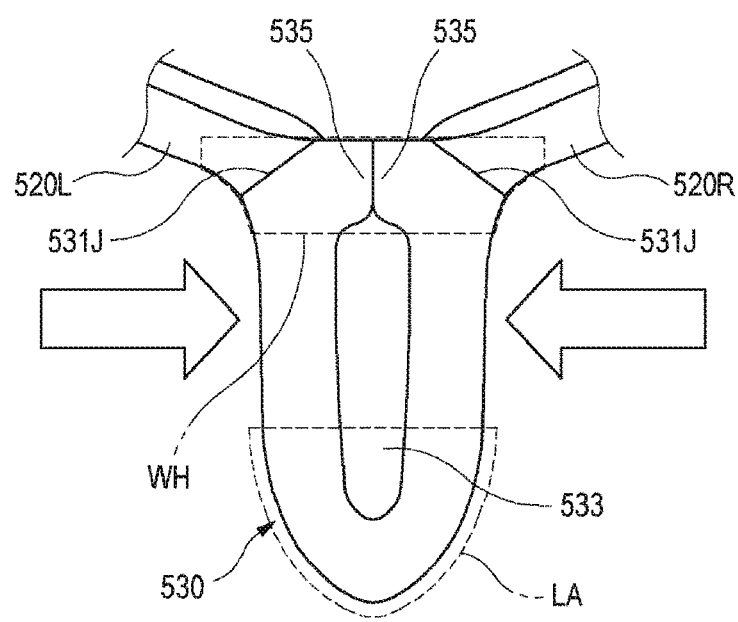
FIG. 25C shows that a slit portion of the first attachment foot portion is narrowed by press working.

As shown in FIGS. 25A and 25B, the second attachment foot portion 550 is separated from the slit portion 532 of the first attachment foot portion 530 by bending. Next, as shown in FIGS. 25B and 25C, the slit portion 532 is narrowed in a direction of arrows shown in FIG. 25C by press working. Then, a pair of the convex portions 535 are brought into contact with each other at the respective intermediate surfaces 535M. The aforementioned press working is performed until the metallic material constituting the blank 500 is plastically deformed and work-hardened. Thus, as shown in FIG. 25C as a work-hardened region WH, the lower ends of the support legs, which become a starting point of torsion in the first attachment foot 130, and a pair of the convex portions located adjacent thereto include a work-hardened portion which is created by the plastic deformation. That is, a pair of the convex portions 535, a portion of the first attachment foot portion 530 located adjacent to the convex portions, joint portions 531J between the first attachment foot portion 530 and the first support leg portions 520L and 520R, and portions of the first support leg portions 520L and 520R located adjacent to the joint portions, all of which pertain to the work-hardened region WH, are plastically deformed and work-hardened by the press working. The aforementioned portions, which pertain to the work-hardened region WH, have a yield stress or a proof stress higher than other portions of the first attachment foot portion 530 which are not work-hardened or are work-hardened to the extent less than the work-hardened region WH (e.g., portions of the first attachment foot portion 530 located adjacent to the first slit 533 of the slit portion 532). Due to the work-hardening made by the aforementioned press working, the first attachment foot 130, which is formed from the first attachment foot portion 530 of the blank 500, has an improved torsion-resistance strength at torsion-applied portions. During the aforementioned press working, the first slit 533 of the slit portion 532 is narrowed only slightly, forming the first slit 133 of the first attachment foot 130. Further, the regions of the first attachment foot portion 530 other than the work-hardened region WH are not work-hardened or work-hardened to the extent less than the work-hardened region WH. Further, a deformation amount of a leading end region LA in the first attachment foot portion 530 is less than a deformation amount of a leading end region in the blank 900 shown in FIG. 1.

Figure 25D:
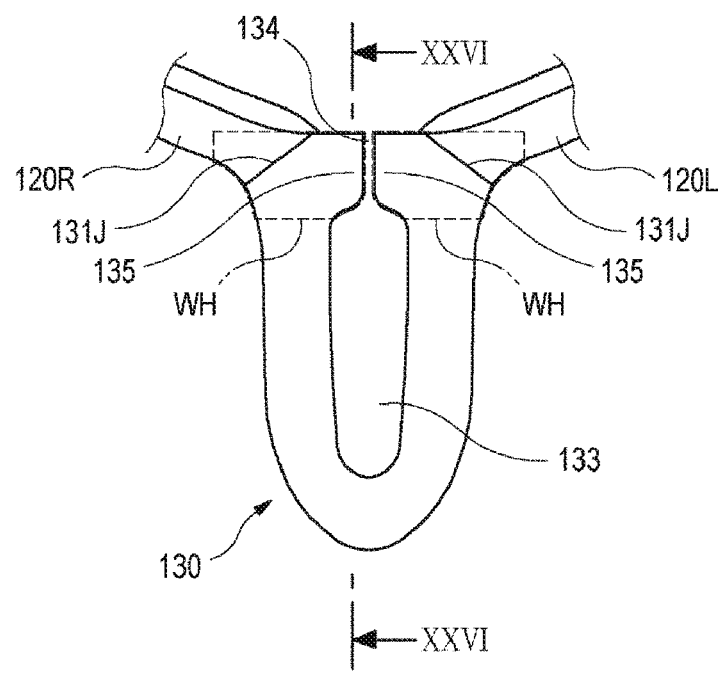
FIG. 25D shows an attachment foot of a fishing line guide according to one embodiment, wherein the attachment foot is formed from the blank shown in FIG. 24.
Figure 26:
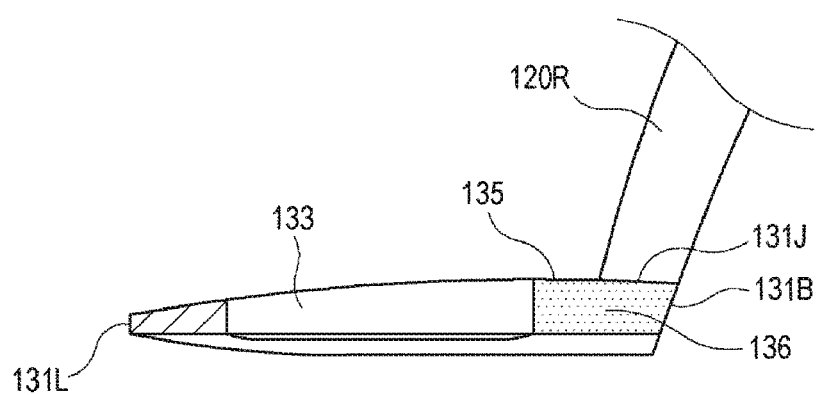
FIG. 26 is a sectional view taken along the line XXVI-XXVI of FIG. 25D.

FIG. 25D shows the first attachment foot 130 formed by the above-described press working, and FIG. 26 shows the work-hardened portion formed in the first attachment foot. Because of the spring back phenomenon occurring after the press working, the second slit 134 of the slit portion 132 is formed between a pair of the convex portions 135, and therefore a pair of the convex portions 135 are spaced apart from each other through the second slit 134. Referring to the work-hardened region WH shown in FIG. 25D and the work-hardened portion shown in FIG. 26, the joint portions 131J between the first support legs 120L and 120R and the first attachment foot 130, a portion located adjacent to the joint portions, and a pair of the convex portions 135 include the work-hardened portion 136 which is created by the plastic deformation through the above-described press working. However, portions of the first attachment foot 130, which are adjacent to the slit portion 132 except the joint portions 131J between the first support legs 120L and 120R and the first attachment foot 130, a portion located adjacent to the joint portions, and a pair of the convex portions 135, do not include the work-hardened portion 136, or include a portion which is work-hardened to the extent less than the work-hardened portion 136.

The attachment foot of the fishing line guide according to embodiments may be manufactured by, but is not limited to, the above-described manufacture processes. In case the attachment foot is manufactured by the above-described manufacture processes, when compared with an attachment foot which does not include the above-described slit portion and the convex portions, the first attachment foot 130 has a broader width due to the slit portion 132 and a pair of the convex portions 135. Thus, the first attachment foot 130 has an improved torsion-resistance strength at the lower ends of the support legs which become the start portion of torsion. Also, when compared with the attachment foot without the slit portion and the convex portions, the weight of the first attachment foot 130 does not increase. Further, the first attachment foot 130 includes the work-hardened portions at the joint portions between the support legs and the attachment foot, the portion adjacent to the joint portions, and a pair of the convex portions. Thus, the first attachment foot 130 has a strong torsion-resistance strength at a portion which resists the torsion caused by the load which is applied to the guide ring 110 by the fishing line. Further, when compared with the attachment foot of the prior art which is entirely work-hardened without forming the slit portion, the deformation amount of the leading end region in the attachment foot decreases. Accordingly, the press working for forming the first attachment foot 130 can be performed with a pressure less than a pressure of the prior art press working by which the entirety of the slit portion is closed. Due to the press working using such a small pressure, the service life of a metallic die can be increased, the productivity of the fishing line guide can be improved, and the fishing line guide can be manufactured at a reduced manufacturing cost.

Second Embodiment

Figure 21:
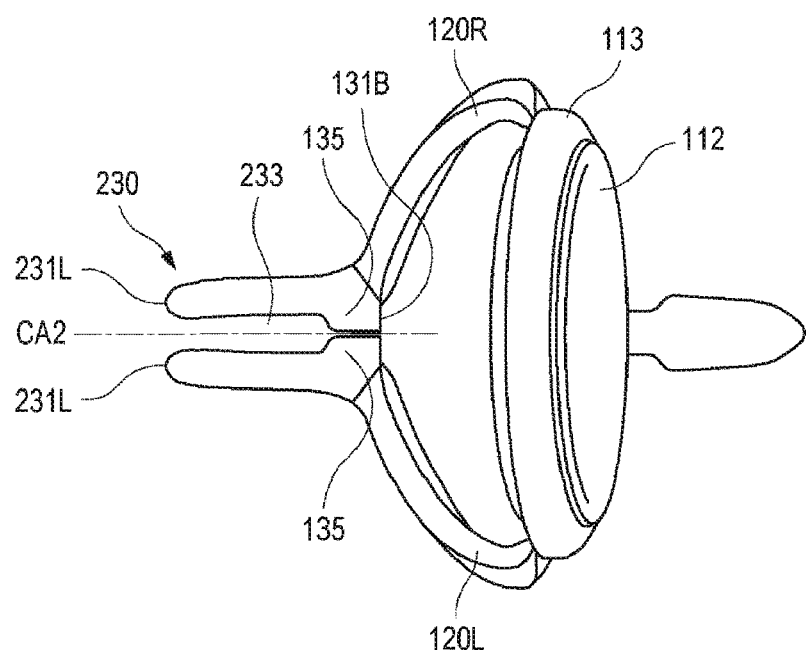
FIG. 21 is a top view of the fishing line guide shown in FIG. 20.

FIGS. 20 and 21 show a fishing line guide 200 having two attachment feet. A slit portion 232 of a first attachment foot 230 of the fishing line guide 200 is formed throughout the entire length of the first attachment foot 230. Accordingly, a first slit 233 of the slit portion 232 extends from the second slit 134 up to a leading end 231L of the first attachment foot 230. That is, the slit portion 232 extends from the base end 131B up to the leading end 231L, and the first attachment foot 230 is divided throughout the entire length by the slit portion 232. Accordingly, the fishing line guide 200 is lighter in weight than the fishing line guide 100. The first attachment foot 230 of the fishing line guide 200 has the same configuration as or a configuration similar to the first attachment foot 130 of the fishing line guide 100, except that the first slit 233 extends up to the leading end 231L of the first attachment foot 230.

Figure 27:
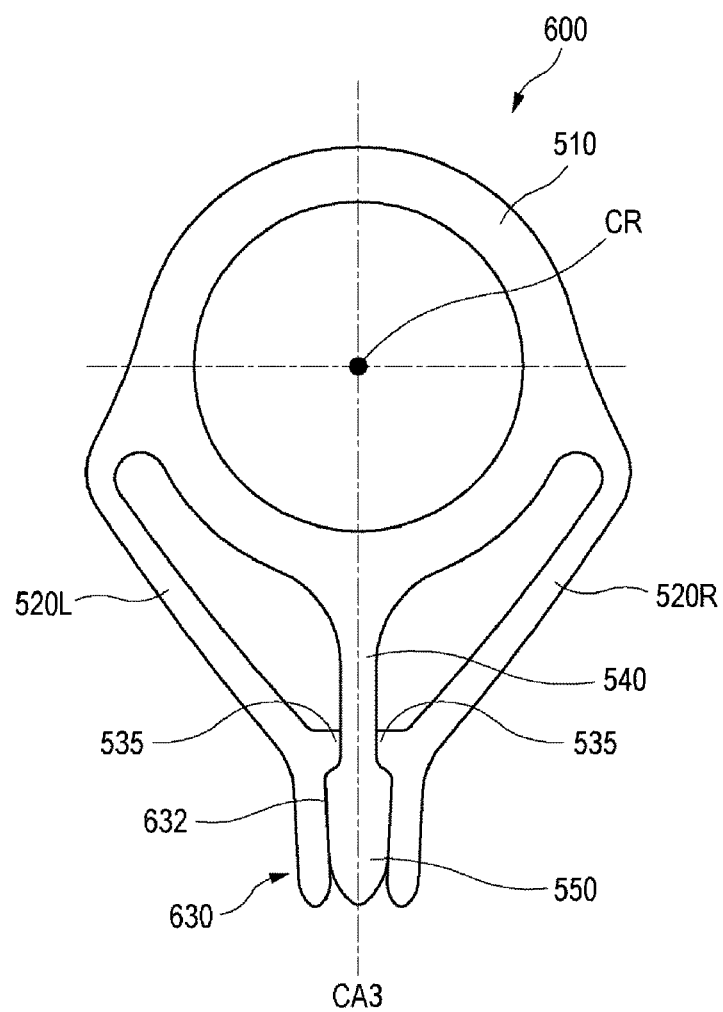
FIG. 27 shows an example of a blank for manufacturing the fishing line guide according to the second embodiment.
Figure 28:
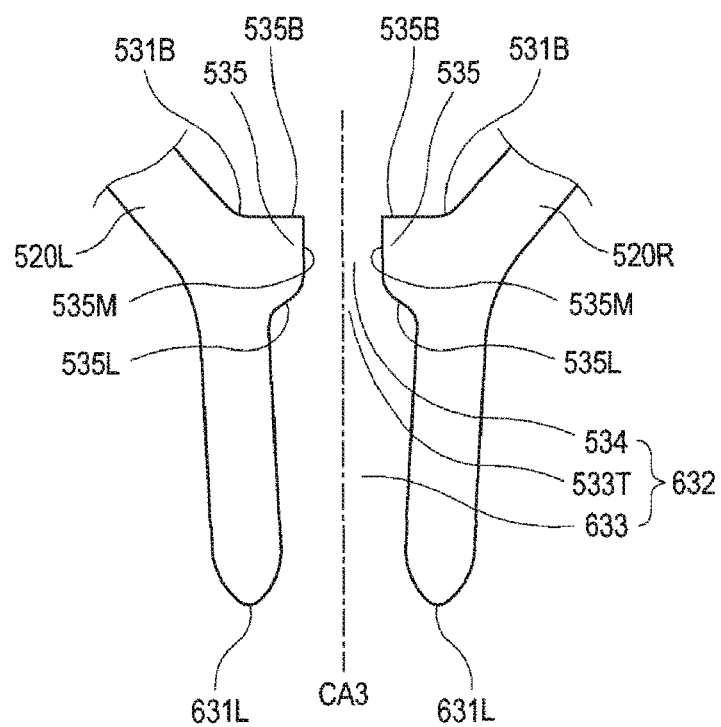
FIG. 28 shows a first attachment foot portion of the blank shown in FIG. 27.

FIGS. 27 and 28 show an example of a blank for manufacturing the fishing line guide 200. The blank 600 shown in FIG. 27 has the same configuration as the blank 500 shown in FIG. 24 except the first slit of the slit portion. A first attachment foot portion 630 of the blank 600 has the base end 531B which adjoins the free ends of the first support leg portions 520L and 520R, and a pair of leading ends 631L which are located opposite the base end 531B along the central axis CA3 passing the center CR of the ring portion 510. The first attachment foot portion 630 has, therein, a slit portion 632 which is formed into the above-described slit portion 232, and a pair of the convex portions 535 which are formed into the above-described pair of the convex portions 135. The slit portion 632 is perforated in the first attachment foot portion 630 in the thickness direction.

The slit portion 632 extends from the base end 531B up to the leading end 631L. The slit portion 632 includes a first slit 633 which is located between the leading end 631L and a pair of the convex portions 535, and the second slit 534 which is located between the intermediate surfaces 535M of the respective convex portions 535 and has a width less than a width of the first slit 633. The first slit 633 and the second slit 534 are connected via the transition portion 533T. The second slit 534 is located adjacent to the base end 531B. The first slit 633 extends from the transition portion 533T up to the leading end 631L, and has the width greater than the width of the second slit 534. Accordingly, the first attachment foot portion 630 is divided by the slit portion 632, and has two halves which have the same shape and are not connected. The first slit 633 is formed into the above-described first slit 233.

After the second attachment foot portion 550 is separated from the first attachment foot portion 630, joint portions between the first attachment foot portion 630 and the first support leg portions 520L and 520R, a portion located adjacent to the joint portions, and a pair of the convex portions 535 are work-hardened by the plastic deformation through the press working described with reference to FIGS. 25C and 25D. Accordingly, the fishing line guide 200 of the second embodiment has an improved torsion-resistance strength at the lower ends of the support legs which become the start point of torsion.

Third Embodiment

FIGS. 22A and 22B show a fishing line guide 300A, 300B having a single attachment foot according to a third embodiment. The fishing line guides 300A and 300B include a single attachment foot and a pair of support legs. The fishing line guides 300A and 300B have the same configuration as the fishing line guides 100 and 200 of the foregoing embodiments respectively, except that fishing line guides 300A and 300B do not include the second support leg and the second attachment foot. An attachment foot 330A of the fishing line guide 300A is the first attachment foot 130 of the above-described fishing line guide 100. An attachment foot 330B of the fishing line guide 300B is the first attachment foot 230 of the above-described fishing line guide 200. The fishing line guides 300A and 300B of this embodiment may be manufactured by using the metallic die for manufacturing the fishing line guide 100 of the above-described embodiment, thereby decreasing manufacturing cost.

Figure 29:
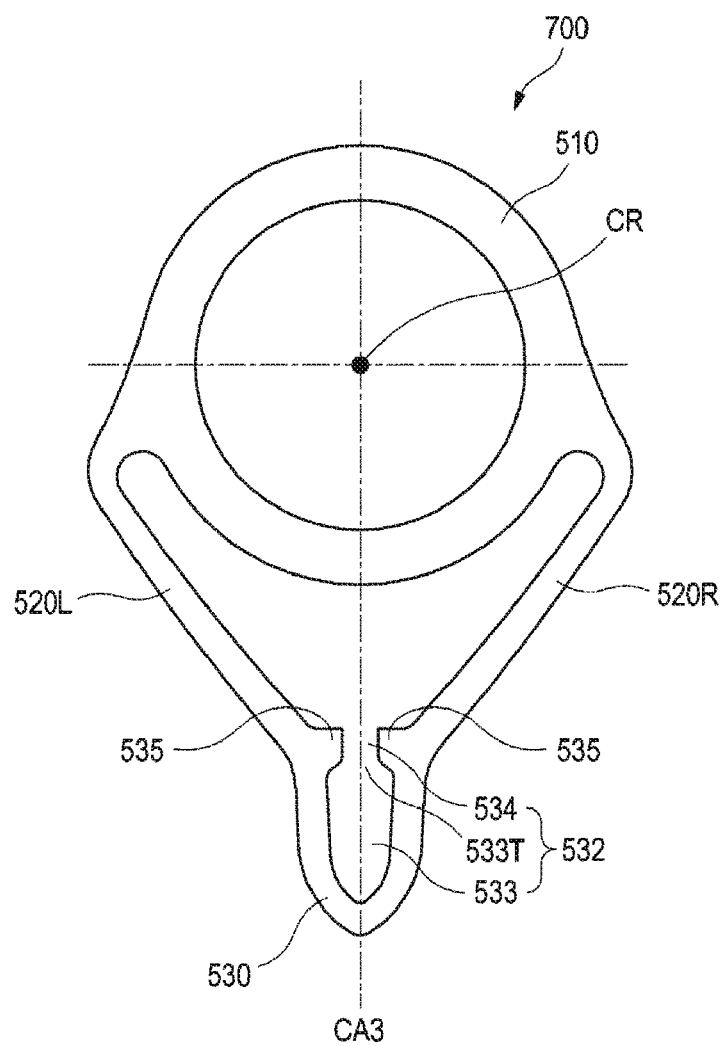
FIG. 29 shows an example of a blank for manufacturing the fishing line guide according to the third embodiment.

FIG. 29 shows an example of a blank for manufacturing the fishing line guide 300A. The blank 700 shown in FIG. 29 has the same configuration as the blank 500 shown in FIG. 24, except the blank 700 does not include the second support leg portion and the second attachment foot portion. When the first attachment foot 130 is formed from the blank 700, the metallic die, which is used for forming the first attachment foot 130 from the blank 500, may be used. Thus, the fishing line guide 300A can be manufactured at a reduced manufacturing cost. The joint portions between the first attachment foot portion 530 and the first support leg portions 520L and 520R, the portion located adjacent to the joint portions, and a pair of the convex portions 535 are work-hardened through the press working described with reference to FIGS. 25C and 25D. Accordingly, the fishing line guide 300A has an improved torsion-resistance strength at the lower ends of the support legs.

Fourth Embodiment

Figure 23A:
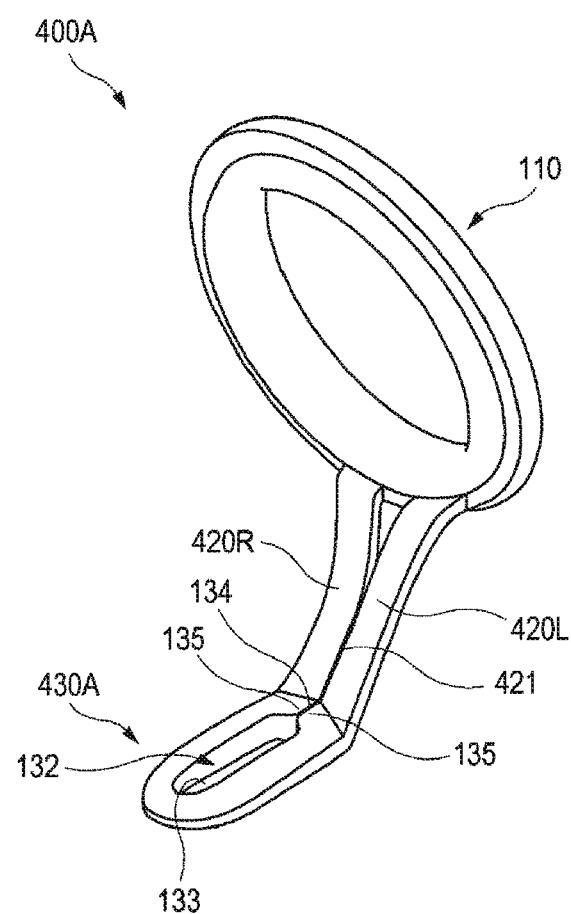
FIG. 23A is a perspective view showing a fishing line guide having a single attachment foot according to a fourth embodiment.

FIGS. 23A and 23B show fishing line guides 400A and 400B having a single attachment foot according to a fourth embodiment. The fishing line guides 400A and 400B respectively shown in FIGS. 23A and 23B include a pair of support legs 420L and 420R extending from a lower edge of the guide ring 110, and a single attachment foot which extends from lower ends of the respective support legs 420L and 420R and is angularly bent from the respective support legs 420L and 420R. The attachment foot 430A of the fishing line guide 400A shown in FIG. 23A is the first attachment foot 130 of the above-described fishing line guide 100. The attachment foot 430B of the fishing line guide 400B shown in FIG. 23B is the first attachment foot 230 of the above-described fishing line guide 200. A pair of the support legs 420L and 420R have a gap 421 therebetween. The gap 421 communicates with the second slit 134 of the attachment foot 430A, 430B. By way of another example, in the case where a pair of the convex portions are partially in contact with each other as shown in FIG. 19, a pair of the support legs 420L and 420R are in contact with each other at some section, and a portion of the gap 421 may not exist. Since a pair of the support legs 420L and 420R neighbor each other, the fishing line guides 400A and 400B have a stronger torsional resistance force.

A fishing line guide of yet another embodiment may include a single support leg in which a pair of support legs (e.g. the support legs 420L and 420R shown in FIGS. 23A and 23B) are formed integrally together, and the above-described first attachment foot 130 or first attachment foot 230 which extends from a lower end of such a single support leg. Such a support leg may be angularly bent in its width direction, and may have a gap communicating with the second slit 134 of the first attachment foot.

The present disclosure described heretofore should not be limited to the above-described embodiments and the examples shown in the accompanying drawings. It will be apparent to those of ordinary skill in the technical field to which the present disclosure pertains, that various substitutions, modifications and alternations may be made without departing from the technical idea of the present disclosure.

DESCRIPTION OF REFERENCE SYMBOLS 10 fishing rod, 12 winding thread, 13 adhesive coating, 13A adhesive anchor, 100 fishing line guide, 110 guide ring, 120L 120R first support leg, 130 first attachment foot, 132 slit portion, 133 first slit, 134 second slit, 135 convex portion, 136 work-hardened portion, 140 second support leg, 150 second attachment foot, 200 fishing line guide, 230 first attachment foot, 232 slit portion, 233 first slit, 300A fishing line guide, 330A attachment foot, 300B fishing line guide, 330B attachment foot, 400A fishing line guide, 420L-420R support leg, 430A attachment foot, 400B fishing line guide, 430B attachment foot, 500 blank, 510 guide ring portion, 520L-520R first support leg portion, 530 first attachment foot portion, 532 slit portion, 533 first slit, 534 second slit, 535 convex portion, 540 second support leg portion, 550 second attachment foot portion, 552 concave portion, 600 blank. 630 first attachment foot portion, 632 slit portion, 633 first slit 633, 700 blank

What is claimed is:

1. A fishing line guide, comprising:
a guide ring through which a fishing line passes;
a support leg connected to the guide ring at an upper end of the support leg; and
an attachment foot extending from a lower end of the support leg and configured to be attached to a fishing rod, the attachment foot having a base end adjoining the lower end of the support leg and a leading end located opposite the base end,
wherein the attachment foot comprises:
a slit portion perforated in the attachment foot along a central axis of the attachment foot from the base end toward the leading end; and
a pair of convex portions located at the slit portion and protruding toward the central axis respectively,
wherein the pair of the convex portions extend from the base end of the attachment foot toward the leading end of the attachment foot, and
wherein each of the pair of the convex portions has a base end surface forming the base end of the attachment foot, a leading end surface located opposite the base end surface along the central axis, and an intermediate surface located between the base end surface and the leading end surface.

2. The fishing line guide of claim 1, wherein at least a portion of each of the pair of the convex portions is located between the leading end and a line segment joining both outermost ends of a joint portion located between the attachment foot and a lower end of the support leg.

3. The fishing line guide of claim 1, wherein the slit portion has a first slit located along the central axis of the attachment foot between the leading end and the pair of the convex portions, and
wherein a maximum width of the attachment foot is three times or more and four times or less of a distance between a first point at which a line passing a maximum width of the first slit and the line being perpendicular to the central axis meets an inner edge of the first slit and a second point at which the line meets an outer edge of the attachment foot.

4. The fishing line guide of claim 1, wherein the slit portion has a first slit and a second slit which are located along the central axis of the attachment foot between the leading end and the base end, and
wherein the second slit has a second width less than a first width of the first slit.

5. The fishing line guide of claim 1, wherein the slit portion extends from the base end up to the leading end and the attachment foot is divided by the slit portion.

6. The fishing line guide of claim 1, wherein the pair of the convex portions are at least partially in contact with each other along the central axis of the attachment foot.

7. The fishing line guide of claim 1, wherein the support leg comprises a pair of first support legs extending from the guide ring respectively, and a single, second support leg extending from the guide ring, the attachment foot extends from lower ends of the pair of the first support legs, further comprising:
another attachment foot extending from a lower end of the second support leg and configured to be attached to the fishing rod,
wherein said another attachment foot includes a pair of concave portions and the pair of the concave portions have a shape coinciding in shape with the pair of the convex portions.

8. The fishing rod including the fishing line guide of claim 1.

9. A blank for a fishing line guide, comprising:
a ring portion;
a pair of first support leg portions extending from the ring portion; and
a first attachment foot portion extending from a first free end of each of the pair of the first support leg portions, the first attachment foot portion having a base end adjoining the first free end of each of the pair of the first support leg portions and a leading end located opposite the base end,
wherein the first attachment foot portion comprises:
a slit portion perforated in the first attachment foot portion along a central axis of the first attachment foot portion from the base end toward the leading end; and
a pair of convex portions located at the slit portion and protruding toward the central axis respectively,
wherein the pair of the convex portions extend from the base end of the first attachment foot portion toward the leading end of the first attachment foot portion, and
wherein each of the pair of the convex portions has a base end surface forming the base end of the first attachment foot portion, a leading end surface located opposite the base end surface along the central axis, and an intermediate surface located between the base end surface and the leading end surface.

10. The blank of claim 9, further comprising:
a single, second support leg portion extending from the ring portion between the first support leg portions; and
a second attachment foot portion extending from a second free end of the second support leg portion,
wherein the second attachment foot portion has a shape coinciding in shape with the slit portion and the pair of the convex portions.

11. The blank of claim 9, wherein the slit portion extends from the base end up to the leading end and the first attachment foot portion is divided by the slit portion.

12. A fishing line guide manufactured from the blank of claim 9.

* * * * *